(12) United States Patent
Chen

(10) Patent No.: US 7,233,952 B1
(45) Date of Patent: Jun. 19, 2007

(54) APPARATUS FOR VISUALIZING INFORMATION IN A DATA WAREHOUSING ENVIRONMENT

(75) Inventor: Li-Wen Chen, Cupertino, CA (US)

(73) Assignee: Hon Hai Precision Industry, Ltd., Taipei Hsien (TW)

( * ) Notice: Subject to any disclaimer, the term of this patent is extended or adjusted under 35 U.S.C. 154(b) by 0 days.

(21) Appl. No.: 09/483,182

(22) Filed: Jan. 13, 2000

Related U.S. Application Data

(60) Provisional application No. 60/116,016, filed on Jan. 15, 1999.

(51) Int. Cl.
*G06F 7/00* (2006.01)
*G06F 17/30* (2006.01)
*G06F 12/00* (2006.01)
*G06F 9/44* (2006.01)
*G06Q 99/00* (2006.01)

(52) U.S. Cl. .................. 707/100; 707/101; 707/104.1; 707/200; 707/201; 717/102; 717/104; 717/105; 705/1

(58) Field of Classification Search ............... 707/1, 707/10, 100, 101, 104.1, 200, 201, 206; 705/1, 705/5, 7, 14, 16, 26, 28, 30, 35, 39, 44, 52; 706/52; 717/5, 102, 104, 105
See application file for complete search history.

(56) References Cited

U.S. PATENT DOCUMENTS

| | | | |
|---|---|---|---|
| 5,615,109 A | 3/1997 | Eder | 705/8 |
| 5,767,854 A | 6/1998 | Anwar | 345/355 |
| 5,794,246 A | 8/1998 | Sankaran et al. | 707/101 |
| 5,799,286 A | 8/1998 | Morgan et al. | 705/30 |
| 5,832,496 A | 11/1998 | Anand et al. | 707/102 |
| 5,978,788 A * | 11/1999 | Castelli et al. | 707/2 |
| 6,161,103 A * | 12/2000 | Rauer et al. | 707/4 |
| 6,212,524 B1 * | 4/2001 | Weissman et al. | 707/101 |
| 6,377,993 B1 * | 4/2002 | Brandt et al. | 709/227 |
| 6,484,179 B1 * | 11/2002 | Roccaforte | 707/102 |
| 6,594,653 B2 * | 7/2003 | Colby et al. | 707/3 |

OTHER PUBLICATIONS

Goodes, Bryon; "Warehousing on the AS/400"; vol. 3, No. 3, Fall 1998; pp. 47, 48, 50,and 51.*
W. H. Inmon; "The Data Warehouse and Data Mining"; ACM; vol. 39, Issue 11; Nov. 1996; pp. 49 and 50.*

(Continued)

*Primary Examiner*—Ella Colbert
(74) *Attorney, Agent, or Firm*—Fliesler Meyer LLP

(57) ABSTRACT

According to the invention, techniques for visualizing customer data contained in databases, data marts and data warehouses. In an exemplary embodiment, the invention provides a apparatus for graphically analyzing relationships in data from one or more data sources of an enterprise. The apparatus can be used with many popular visualization tools, such as On Line Analytical Processing (OLAP) tools and the like. The apparatus is especially useful in conjunction with a meta-model based technique for modeling the enterprise data. The enterprise is typically a business activity, but can also be other loci of human activity. Embodiments according to the invention can display data from a variety of sources in order to provide visual representations of data in a data warehousing environment.

18 Claims, 18 Drawing Sheets

OTHER PUBLICATIONS

Charles Bontempo and George Zagelow; The IBM Data Warehouse Architecture; ACM; vol. 41, Issue 9; Sep. 1998; pp. 38-48.*

Business Wire; "SelectStar Ships StarTrieve Version 1.5; Relational OLAP Tool Offers Power And Simplicity"; Oct. 19, 1995; pp. 1 and 2.*

Michael Krippendorf and Il-Yeol Song; "The Translation of Star Schema into Entity-Relationship Diagrams"; IEEE: 1-2 Sep. 1997; pp. 390-395.*

Hou, Jennie, et al.; "Data Warehousing on HP3000 Using IMAGE/SQL— A New Alternative!"; HP World Conference 1998 Paper #2264; Aug. 2-7, 1998; pp. 1-30; XP-002214273, San Diego, CA.

Informix Software, Inc.; "Explorer User's Guide—MetaCube™ ROLAP Option for Informix® Dynamic Server™"; Jan. 1998; Version 4.0; pp. i-vii and 1-1:2-34; XP-002214274; INFORMIX® PRESS.

Gupta, Vivek R.; "An Introduction to Data Warehousing"; Aug. 1997; System Services Corporation, Chicago, Illinois; XP-002204504.

Gray, Jim, et al.; "Data Cube: A Relational Aggregation Operator Generalizing Group-By, Cross-Tab, and Sub-Totals"; Data Mining and Knowlege Discovery; 1997; pp. 29-53; 1997 Kluwer Academic Publishers; XP002901286.

Vassiliadis, Panos, et al.; "Modeling Multidimensional Databases, Cubes and Cube Operations"; Scientific and Statistical Database Management, Jul. 1-3, 1998; IEEE Proceedings from Tenth International Conference on Capri, Italy; ISBN 0-8186-8575-1/98; XP10291092.

Chaudhuri, Surajit, et al.; "An Overview of Data Warehousing and OLAP Technology"; Sigmod Record, Association for Computing Machinery; Mar. 1997; pp. 65-74; vol. 26, No. 1; XP-002115173.

* cited by examiner

APPARATUS FOR VISUALIZING INFORMATION IN A DATA WAREHOUSING ENVIRONMENT

CROSS-REFERENCES TO RELATED APPLICATIONS

U.S. Provisional Patent Application Ser. No. 60/116,016 Li-Wen Chen entitled, "METHOD AND APPARATUS FOR PROCESSING CUSTOMER DATA FOR OLAP INTEGRATION AND APPLICATION INTEGRATION BASED ON REVERSE STAR SCHEMA," filed Jan. 15, 1999.

The following commonly-owned applications, including this one, are being filed concurrently and the others are hereby incorporated by reference in their entirety for all purposes:

1. U.S. patent application Ser. No. 09/483,385, Li-Wen Chen entitled, "METHOD FOR VISUALIZING INFORMATION IN A DATA WAREHOUSING ENVIRONMENT," pending;

3. U.S. patent application Ser. No. 09/483,386, Li-Wen Chen entitled, "SYSTEM FOR VISUALIZING INFORMATION IN A DATA WAREHOUSING ENVIRONMENT," issued as U.S. Pat. No. 7,007,029.

BACKGROUND OF THE INVENTION

The present invention relates generally to computer database systems, and specifically to an apparatus for visualizing information having dynamic formats stored in a data warehousing environment.

Few could foresee the rapid development of computer technology just a few years ago. Computers now have a place in our homes, our offices, our schools and even our briefcases and satchels. As computer automation continues to impact an ever increasing portion of our daily lives, governments, businesses and individuals have turned to database technology to help them manage the "information explosion," the exponential proliferation of information that must be sorted, assimilated and managed on a continuing basis. One area of importance to the database design field is data model selection for database applications.

A data model represents the structure or organization of data stored in the database. It enables the use of data in certain forms and may limit the data being used in other forms. Different applications usually require different data models. Many different data models can exist, and they usually differ markedly from one another. Typically, database applications are customized to a particular data model of a particular database. Usually, these applications must be re-implemented for every database, even though the functioning of the application remains the same.

Presently, database developers have turned to data warehousing technology to resolve often conflicting data management requirements. Traditional data warehousing approaches focus on decision support applications, which emphasize summarized information having static formats. While perceived advantages exist, an inherent disadvantage to these systems is that the customer identity is lost. Further, usability of customer data analyses techniques can be improved over traditional approaches for displaying analysis results and database content to the user.

What is needed is an apparatus for analyzing customer data contained in databases, data marts and data warehouses and present the information in dynamic formats.

SUMMARY OF THE INVENTION

According to the invention, techniques for visualizing customer data contained in databases, data marts and data warehouses are provided. In an exemplary embodiment, the invention provides an apparatus for graphically analyzing relationships in data from one or more data sources of an enterprise. The apparatus can be used with many popular visualization tools, such as On Line Analytical Processing (OLAP) tools and the like. The apparatus is especially useful in conjunction with a meta-model based technique for modeling the enterprise data. The enterprise is typically a business activity, but can also be other loci of human activity. Embodiments according to the invention can display data from a variety of sources in order to provide visual representations of data in a data warehousing environment.

A first aspect in accordance with the present invention provides an apparatus for graphically analyzing relationships in data from one or more data sources of an enterprise. An embodiment of the apparatus can include a computer memory and a processor. The apparatus can perform a variety of functions, such as receiving a definition of at least one customer profile of a plurality of customer profile groups. Receiving from user input an indicator of a report configuration selection is also performed by the apparatus. Creating at least one first dimension table and at least one fact table based upon the report configuration selection and the information are performed by the apparatus. The apparatus can also provide a report comprised of the at least one first dimension table and the at least one fact table. Embodiments can provide reports using any of a plurality of quantitative analysis techniques, such as percentile, cumulative, ranking, and range brackets; statistical techniques, such as pareto, histogram, bell curve, and linear regressions; data mining techniques, such as affinity rules, neural networks, decision trees and fractal geometry; financial analysis techniques, such as net present value; and time series techniques, such as moving average.

Some embodiments can also create a list of customers for each customer profile in said plurality of customer profile groups and create customer classification components in a meta model for each customer profile group. The meta model can be a customer centric model, such as a reverse star schema for example.

In a particular embodiment, the present invention provides an apparatus for creating a customer profile report for business performance measures and the like. In this embodiment, creating at least one first dimension table includes creating a customer profile hierarchy; and creating at least one fact table further comprises aggregating business performance measures according to the customer profile hierarchy.

In another embodiment, the present invention provides an apparatus for creating an operation report for business performance measures and the like. In this embodiment, creating at least one fact table comprises aggregating the business performance measures and filtering the customer profiles.

In a yet further embodiment, the present invention provides an apparatus for creating a customer behavior report for customer records and the like. In this embodiment, creating at least one first dimension table comprises creating customer profiles; and creating at least one fact table comprises aggregating customer records based on the customer profiles.

A second aspect in accordance with the present invention provides for an apparatus for transferring information organized according to a first data model to an organization according to a second selectable data model to serve as the bases of analysis of the data. The apparatus can perform a variety of functions such as receiving as input a definition for the first data model and receiving as input a definition for the second data model. Creating a mapping to provide a translation for data from the first data model to the second data model can also be performed by the apparatus. Thereupon, data can be migrated from the first database to the second database according to the mapping.

A third aspect in accordance with the present invention provides for an apparatus for analyzing information from a database. The database can be organized according to a first data model. The apparatus can perform receiving as input a definition of a second data model. Creating a mapping from the first data model to the second data model can also be performed by the apparatus. The apparatus can then analyze the data based upon the second data model and the mapping.

Embodiments can organize data into data models to support any of a plurality of analyses models, such as scoring models, including profitability gains tables, recency and frequency monetary amount analysis, and retention and migration rate analysis; segmentation models, such as demographic, geographic, behavior, propensity to buy, propensity to terminate; and profiling models, such as customer life time value, sequence analysis, and affinity analysis.

Numerous benefits are achieved by way of the present invention over conventional techniques. The present invention can provide techniques for visualizing data relationships that can be customized to fit different business needs. Yet further, some embodiments using the techniques and data models according to the present invention can be used to solve customer data analysis problems. Many embodiments can provide the ability to users to customize their data displays for use with generic and reusable customer data analysis functions. Embodiments can provide dynamic viewing of customer dynamics and business dynamics. Many embodiments enable business applications to be built more easily, quickly and with greater expandability than heretofore known apparatus. These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

Embodiments according to the present invention can provide techniques for conducting customer data analysis based upon data present in enterprise information processing systems and visualizing the results of the analyses.

Presently, enterprises can posses one or more decision support systems (DSS) that focus on providing information to the decision maker to support various enterprise operations. Typically, this information centers on the operational performance and efficiency of an entire entity, such as a business, public entity, governmental agency and the like. However, legacy business decision systems are often built upon operation-centric paradigms, limiting their usefulness in customer-centric applications. Presently, capabilities to analyze customer intelligence, i.e., information about customer profiles, customer behaviors, and customer business behavior have become important sources of information to the decision maker.

Legacy systems can include a plurality of separate or networked information systems, each supporting a particular business operation and business processes. For example, so named "mission-critical systems" support day-to-day business operations. These can include operational and transactional systems in corporate or governmental "back offices," such as enterprise resource planning applications, manufacturing applications, human resource applications, and the like. Systems deployed in so named "front office" applications are used by persons such as sales representatives, customer service representatives, or marketing staff, to serve customers daily. For example, sales force automation systems (SFA), marketing automation systems, helpdesk and the like are representative front office systems. Both Front Office and Back Office applications provide support for daily operations of the enterprise.

Decision support systems provide analysis of summarized information and the like based upon an user's needs in analyzing and understanding the performance and efficiency of operations. Decision support systems can include data warehouse, datamarts, and the like. Decision support systems are predominately based on multi-dimensional models, and can provide certain customer intelligence analysis functionality. Decision support systems can provide decision makers with a "macro view" of the performance of operations. Typically, decision support systems comprise a data model having business dimensions that are defined during the design of the system.

Figure 1A:
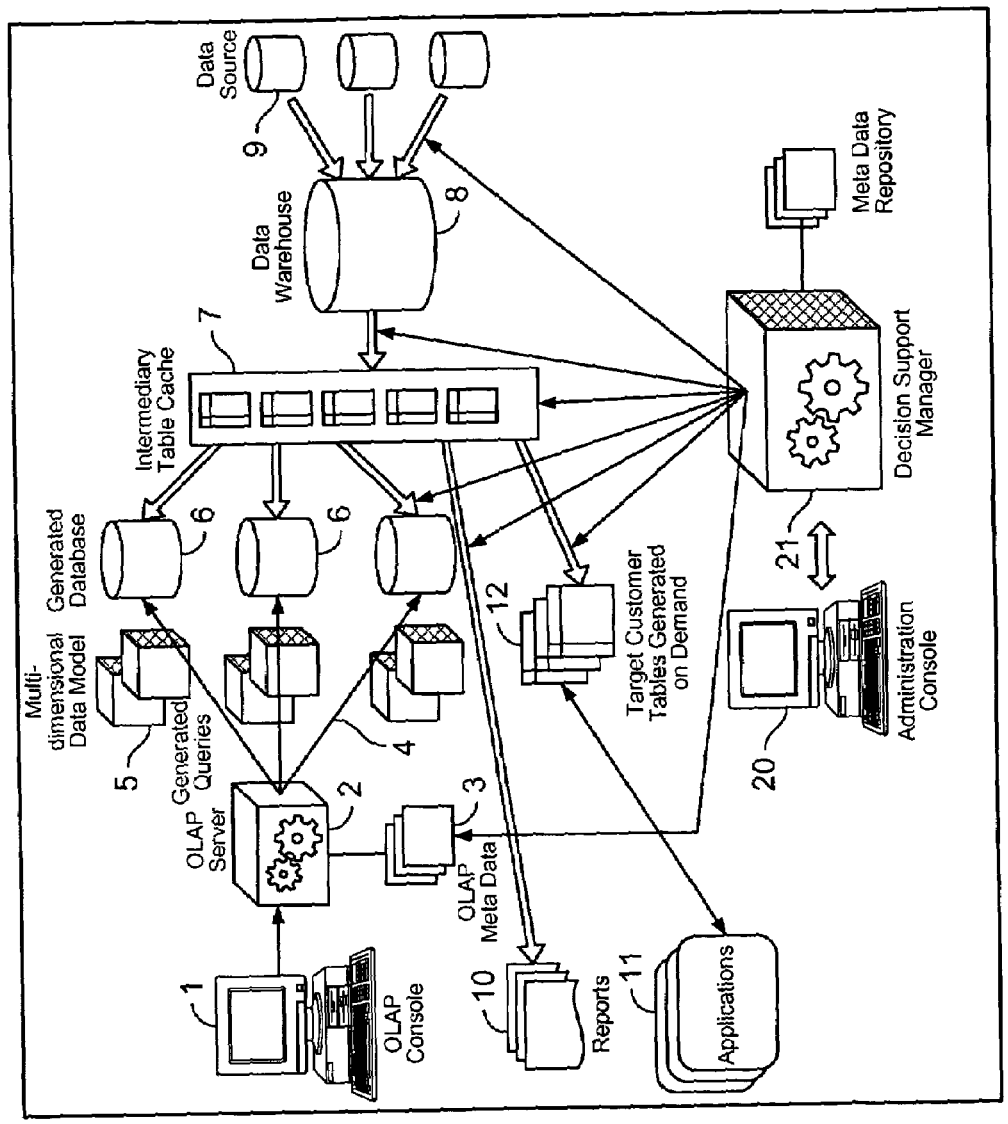
FIG. 1A illustrates representative architecture for data analysis and visualization according to the present invention.

FIG. 1A illustrates the system architecture of the Customer-Centric Decision Support System in a particular embodiment according to the present invention. This diagram is merely an illustration and should not limit the scope of the claims herein. One of ordinary skill in the art would recognize other variations, modifications, and alternatives. FIG. 1 illustrates a plurality of components, such as an OLAP console 1. OLAP console 1 provides an interface to users who analyze data presented in OLAP form. OLAP console 1 provides a "front end" to OLAP tools that accept users' command inputs. An OLAP server 2. generates database queries 4 for databases 6 from users' command inputs. The users can enter command inputs using a graphical user interface (GUI) or command line interfaces and the like. The command inputs can be applied to database 6 in order to retrieve information that can be provided to the user for presentation on OLAP console 1 using a GUI, or other presentation device. OLAP tools (not shown) can be used to manipulate data using a GUI in accordance with multidimensional model 5, for example. The OLAP server can translate users' command inputs to database queries using a mapping of a users' multidimensional data model, as will be discussed in further detail below.

OLAP meta data 3 can comprise a mapping from the user's multi-dimensional data models to a database model, such as data base 6. OLAP meta data 3 can provide a mapping of tables and attributes of multi-dimensional model 5 to dimensions and facts for database 6, for example.

OLAP generated queries 4 can be generated by OLAP server 2 to retrieve a result set from database 6, for example. Multi-dimensional models 5 comprise conceptual models that can provide a "macro" view of business performance, for example. Such models can help business analysts to understand the performance of business operations, and the like.

Decision support manager 21 manages processes of defining, creating, and generating data models, reports, meta data, tables and the like (3, 5, 6 and 12). Administration console 20 enables users to define data models, reports, and the like to Decision support manager 21. This console can display the data models to users in a GUI, for example.

Database 6 is created by the decision support manager 21. Users can define a schema for database 6 from an administration console 20. Administration console 20 can be co-located with the OLAP console 1, in a particular embodiment. Users can define multi-dimensional models for their data using administration console 20. After users define their models, the decision support manager 21 can automatically create databases, such as database 6, according to the users' data model definitions. The decision support manager 21 can generate star schema data models that correspond to the multi-dimensional cube 5, for example. Manager 21 can generate procedures and mapping rules to populate databases with data from the data warehouse 8.

Meta data repository 22 can store meta data used by decision support manager 21. This meta data can include definitions for data models, reports, tables, procedures for managing processes, operational meta data, such as scheduling information, and the like.

When users request reports, decision support manager 21 can generate intermediary tables, such as qualified target customer tables, for example, that can be reused later in other queries. Intermediary tables can be generated by a process for generating temporary tables that can be co-located with decision support manager 21. Intermediary table cache 7 can manage intermediary tables in memory. Intermediary table cache 7 can maintain intermediary results in memory based on any of a plurality of cache replacement algorithms such as LRU, for example. In a presently preferred embodiment, decision support manager 21 can comprise a management process for managing the intermediary table cache 7.

Data warehouse 8 comprises a data repository for customer data, business operational data, and the like. Data warehouse 8 can comprise a database, and can be used as an operational data store, for example. In a presently preferred embodiment, data warehouse 8 can have an identity centric data organization with customer information comprising the center identity. This data organization is sometimes referred to as a "reverse star schema" data model. This data organization comprises a "back-end tier" of data warehouse 8, while the front end tier is based on a data model called a "star schema".

Data sources 9 comprise sources of the original data. In a representative embodiment, data sources 9 are the operational systems of an enterprise, such as a business, for example, used to manage day-to-day business operations, and the like. Data from data sources 9 can be transformed and moved before it is used. The data can be transformed into a reverse star schema data model, for example, when it is stored into the data warehouse 8.

Analysis reports 10 can be generated from the contents of data warehouse 8. Users can request reports from the administration console 20. Manager 21 can formulate a query to database 6 in order to retrieve data. Manager 21 can send the data to the user as a report.

Applications 11 comprise business applications, and the like, that work with data stored in data warehouse 8. Applications 11 can comprise sales force automation applications, marketing automation applications, E-commerce applications, and the like. Users can select targeted customer segments of interest to be input to the application 11 using the administration console 20. Manager 21 can automatically generate the tables for integration with the applications.

Targeted customer tables 12 contain information about targeted customers. These tables can be generated on demand, by schedule, or manually. Business applications can be integrated with customer-centric decision support functions based on tables 12 that can be generated from the data warehouse 8, for example.

OLAP meta data can be generated based on a defined data model, such as multi dimensional data models 5, for example. Manager 21 can populate OLAP meta data 3 with meta data derived from users' definitions of data models. Thus, the OLAP meta data 3 can be automatically generated.

Figure 1B:
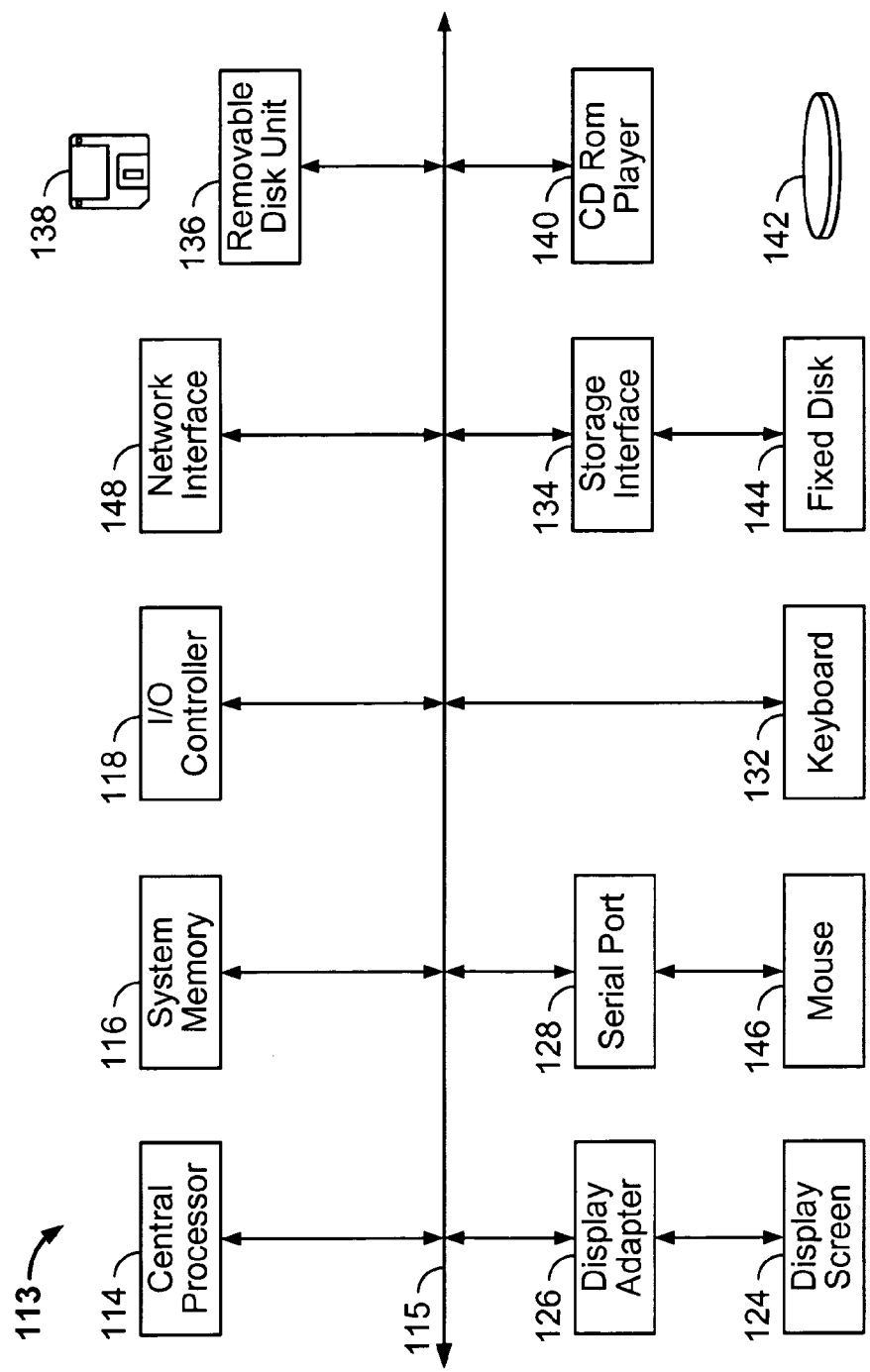
FIG. 1B illustrates a representative computer system suitable for implementing a particular embodiment according to the present invention.

FIG. 1B illustrates a representative computer system suitable for implementing a particular embodiment according to the present invention. This diagram is merely an illustration and should not limit the scope of the claims herein. One of ordinary skill in the art would recognize other variations, modifications, and alternatives. FIG. 1B shows basic subsystems of a computer system 113 suitable for use with the present invention. In FIG. 1B, computer system 113 includes a bus 115 which interconnects major subsystems such as a central processor 114, a system memory 116, an input/output controller 118, an external device such as a printer (not shown), a display screen 124 via a display adapter 126, a serial port 128, a keyboard 132, a fixed disk drive 144 and a removable disk drive 136 operative to receive a removable disk 138. Many other devices may be connected such as a scanner (not shown) via I/O controller 118, a mouse 146 connected to serial port 128 or a network interface 148. Many other devices or subsystems (not shown) may be connected in a similar manner. Also, it is not necessary for all of the devices shown in FIG. 1B to be present to practice the present invention, as discussed below. The devices and subsystems may be interconnected in different ways from that shown in FIG. 1B. The operation of a computer system such as that shown in FIG. 1B is readily known in the art and is not discussed in detail in the present application. Source code to implement the present invention may be operably disposed in system memory 116 or stored on storage media such as a fixed disk 144 or a removable disk 138.

In a presently preferable embodiment according to the present invention, a apparatus for providing customer data analysis capabilities heretofore unknown in the prior art can be operably disposed in the system memory 116 or fixed disk 144 of system 113 of FIG. 1B. Customer data analysis can include, but is not limited to, decision support analysis that relates business decisions to customer behavior. Customer data analysis applications can analyze data based on customer identity and correlate customer activities, events, transactions, and status to the customers' identity. Techniques such as decision support applications, summarizing techniques and the like can also be used without departing from the scope of the present invention.

A data model represents an organization of data in a database. Choice of a data model facilitates the use of data in certain ways and may limit the use of data in others. Different applications typically require different data models that are usually quite different from one another. Thus, database applications are typically customized to the data model used by the database. These applications can be implemented for databases having different data models even though the underlying logic of the application may be similar. A meta model is an abstract data model that describes relationships between different entities or groups of entities in a data model. Applications designed and developed in accordance with a particular meta model can be reused in other similar situations. Applications can be readily customized by exposing customizable details as meta data to application code. Thus, applications can customize a data model by following the relationships described in the meta model.

Application developers can consider trade-offs among competing factors when creating a meta model. Some of these factors are: 1) the ability to customize the data model to fit different business application needs; 2) flexibility in designing re-usable application code; and 3) the usefulness of the application when using a particular specialized data model.

Database applications can be written to conform to a meta model and refer to the detailed data model through means such as a data dictionary, for example. These and other techniques according to the present invention enable application code to be reusable. One example of a data model/meta model combination is the star schema/multidimensional model combination that can be useful in data warehouse applications. In this combination, the star schema comprises a "universal data model" and the multidimensional model comprises a meta model.

Data warehouses can use multi-dimensional models, such as meta models, to conceptualize business operations, for example. Such meta models can simplify tasks of analyzing and understanding the performance or efficiencies of business operations. Multi-dimensional models can provide "macro" views of the business performance, for example. Such views can be highly summarized in order to show the company executives a clear "big picture" of the business. Each piece of data can be indexed by multiple business processes, aspects, and the like in order to illustrate data from different view points to the executives.

Figure 2A:
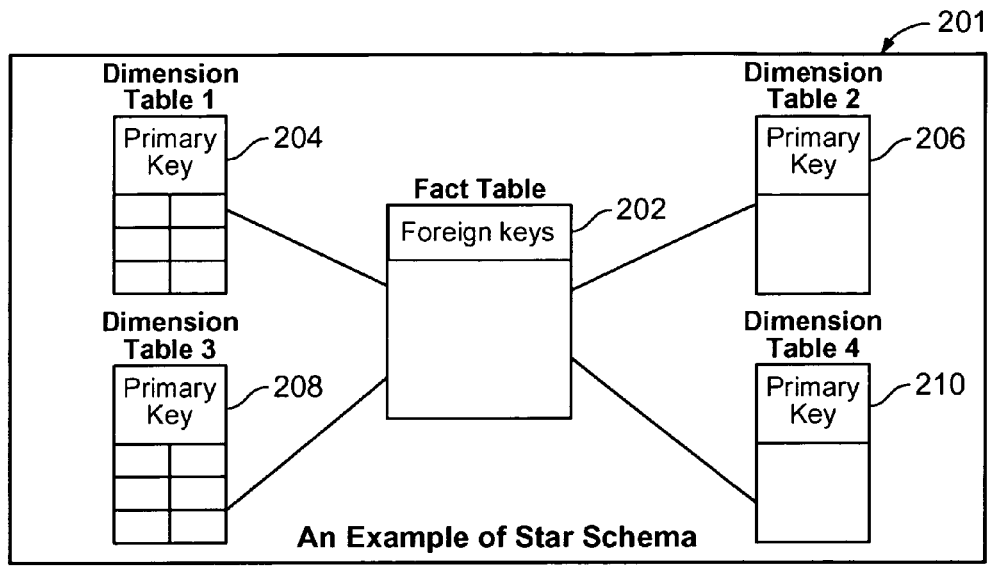
FIGS. 2A–2D illustrate data model examples in particular embodiments according to the present invention.

FIG. 2A illustrates a representation of a data model in a particular embodiment according to the present invention. This diagram is merely an illustration and should not limit the scope of the claims herein. One of ordinary skill in the art would recognize other variations, modifications, and alternatives. FIG. 2A illustrates a data model 201 having a star schema arrangement. Other arrangements are readily recognizable by those of ordinary skill in the art without departing from the scope of the claimed invention. Data model 201 comprises a fact table 202 and a plurality of dimension tables 204, 206, 208 and 210. The dimension tables are mapped to the indices of the dimensions in a multi-dimensional model of the database, and the records in the fact table can be mapped to the measures or data points in the multi-dimensional model of the data base.

Figure 2B:
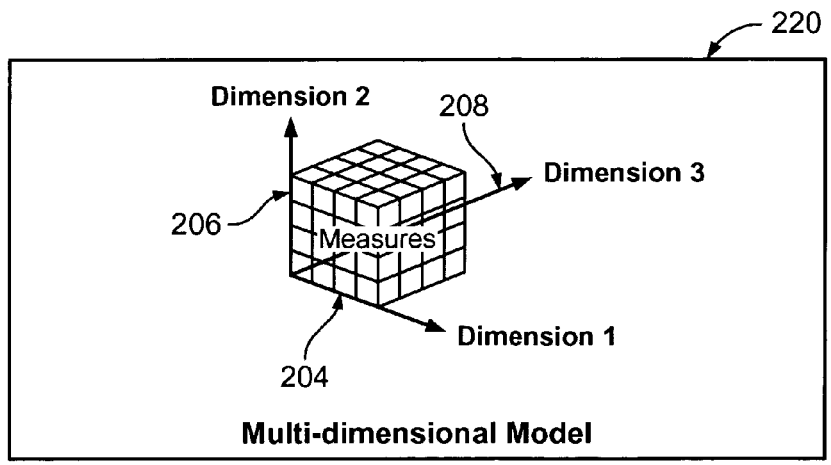

FIG. 2B illustrates a cube representation 220 representing the organization of dimension tables 204, 206, 208 and 210 and fact table 202 in data model 201 of FIG. 2A in a particular embodiment according to the present invention. This diagram is merely an illustration and should not limit the scope of the claims herein. One of ordinary skill in the art would recognize other variations, modifications, and alternatives. The dimensions of cube representation 220 in FIG. 2B can be defined at the time the database is created. However, alternative embodiments for providing customer data analyses based on dynamic behavior of customers can create data cube representations, such as cube 220, from data in the data warehouse dynamically. Such embodiments can make the information accessible to the user on demand.

Figure 2C:
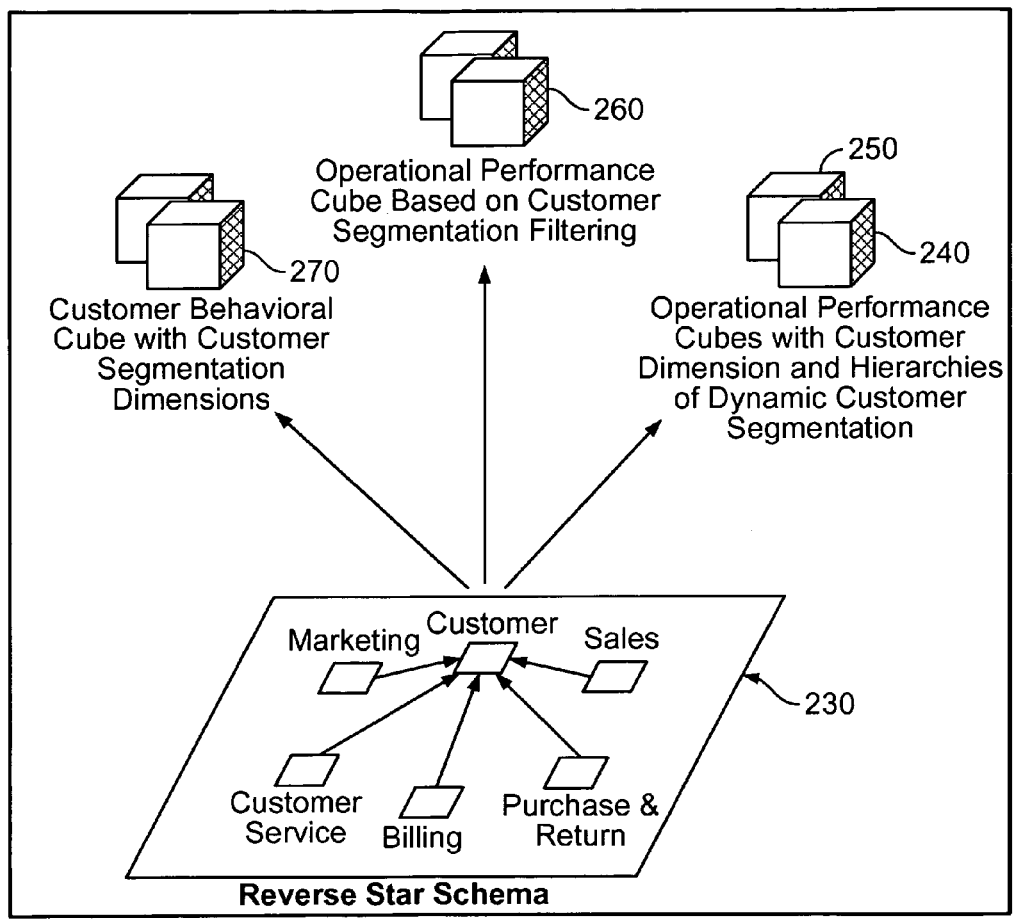

FIG. 2C illustrates a mapping of a conceptual model, such as a meta model, into a data model in a particular embodiment according to the present invention. This diagram is merely an illustration and should not limit the scope of the claims herein. One of ordinary skill in the art would recognize other variations, modifications, and alternatives. FIG. 2C illustrates the mapping of relationships defined at the meta model level to a plurality of relational data models, represented by a plurality of cubes. In a present embodiment, the relational data models can have a "star schema" organization that is suitable for describing operational performance of enterprise-wide decision support mechanisms, for example. Star schema data organizations will be discussed in further below. Persons of ordinary skill in the art can readily create many variations of the star schema and multi-dimensional models to support a diverse plurality of applications, tools, systems, and frameworks without departing from the scope of the claimed invention. In an alternative embodiment, a multi-dimensional data base system can be implemented using a multi-dimensional model without mapping to a data model.

FIG. 2C illustrates generating multi-dimensional data models from a meta model in a particular embodiment according to the present invention. This diagram is merely an illustration and should not limit the scope of the claims herein. One of ordinary skill in the art would recognize other variations, modifications, and alternatives. FIG. 2C illustrates a meta model 230. Meta model 230 has a customer centric organization. However, other organizations can be used without departing from the scope of the claimed invention.

FIG. 2C illustrates mapping meta model 230 into a plurality of data models, represented by cubes 270, 260, 250 and 240. Cubes 240 and 250, which are representative of operational performance based data organizations having a customer dimension and hierarchies of dynamic customer segmentations. Operational performance based data organizations having customer dimensions can show business performance measures as they relate to customer characteristics. FIG. 2C also illustrates a cube 260, which is a representative example of an operational performance based data organization having a customer segmentation filter. Operational performance based data organizations can show certain business performance measures, such as sales amounts, for example, in the context of customer segmentations, such as revenue measure by product line and sales channels for customers that purchased a certain product within a specific time frame. FIG. 2C also illustrates cube 270, which is a representative example of a customer behavioral based data organization having a plurality of customer segmentation dimensions. Customer behavioral organizations can illustrate the customer's business behavioral distribution using different categorizations or segmentations.

Figure 2D:
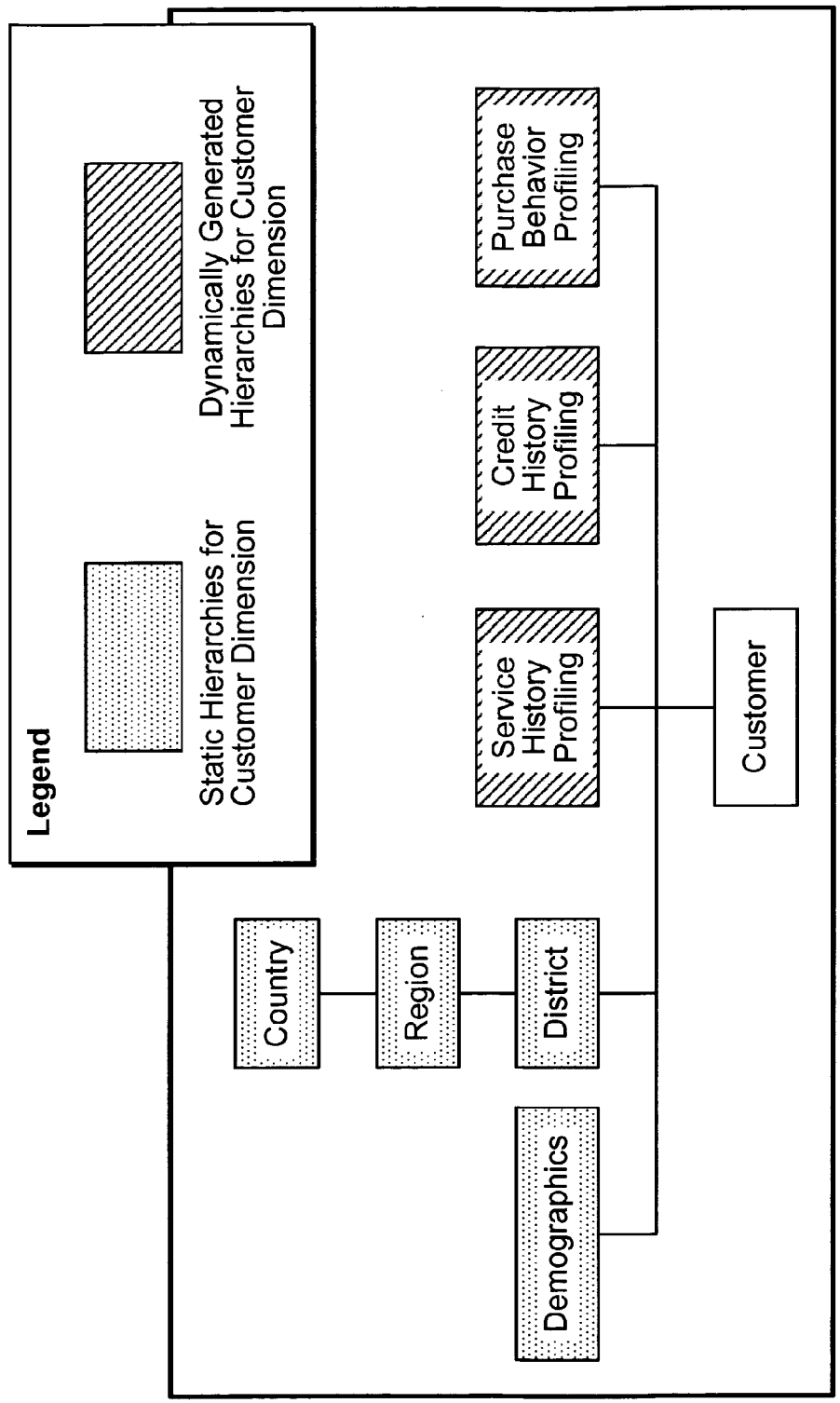

FIG. 2D illustrates a simplified representation of meta model 230 of FIG. 2C in a particular embodiment according to the present invention. This diagram is merely an illustration and should not limit the scope of the claims herein. One of ordinary skill in the art would recognize other variations, modifications, and alternatives.

The data models of FIGS. 2A–2D, as well as modifications and other data models readily apparent to those of ordinary skill in the art, can provide the bases for a plurality of applications in the embodiments according to the present invention, as will be described in greater detail below with reference to FIGS. 3A–3D using an example of a business customer data warehouse.

Figure 3A:
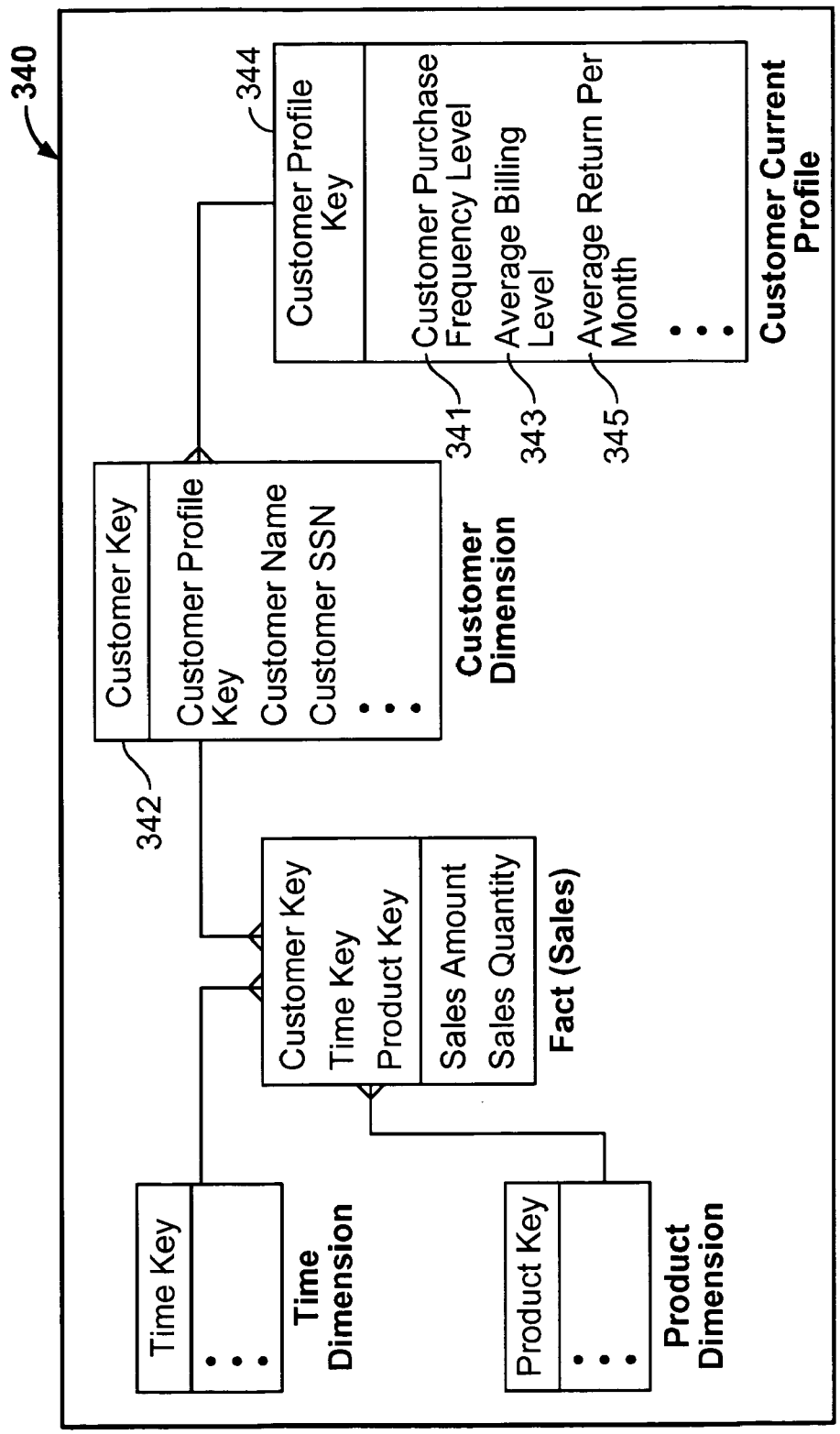
FIGS. 3A–3D illustrate representative data models in particular embodiments according to the present invention.

FIGS. 3A–3D illustrate simplified entity relationship diagrams for representative example information relationships, or "schema" that can support customer intelligence analysis in various embodiments according to the present invention. FIG. 3A illustrates a data model 340 in a particular embodiment according to the present invention. This diagram is merely an illustration and should not limit the scope of the claims herein. One of ordinary skill in the art would recognize other variations, modifications, and alternatives. Data model 340 is a representative example of the operational performance data organizations illustrated by cube 240 of FIG. 2C. FIG. 3A illustrates data model 340 that includes a customer dimension 342 for analyzing sales by customer. Data model 340 also includes a customer profile entity 344 to enable applications to determine sales by customer segments based on a profile. Data model 340 enables a customer profile to be developed based upon a plurality of pre-defined static characteristics or defined dynamic characteristics in profile entity 344. In this example, customer profile entity 344 includes defined profiling attributes of customer purchase frequency level 341, average billing level 343 and average return per month 345. Data model 340 is merely one example of a plurality of data models that can be used for customer data analysis. Other attributes can be added, and other arrangements can be used by those of ordinary skill in the art without departing from the scope of the claims of the invention.

Figure 3B:
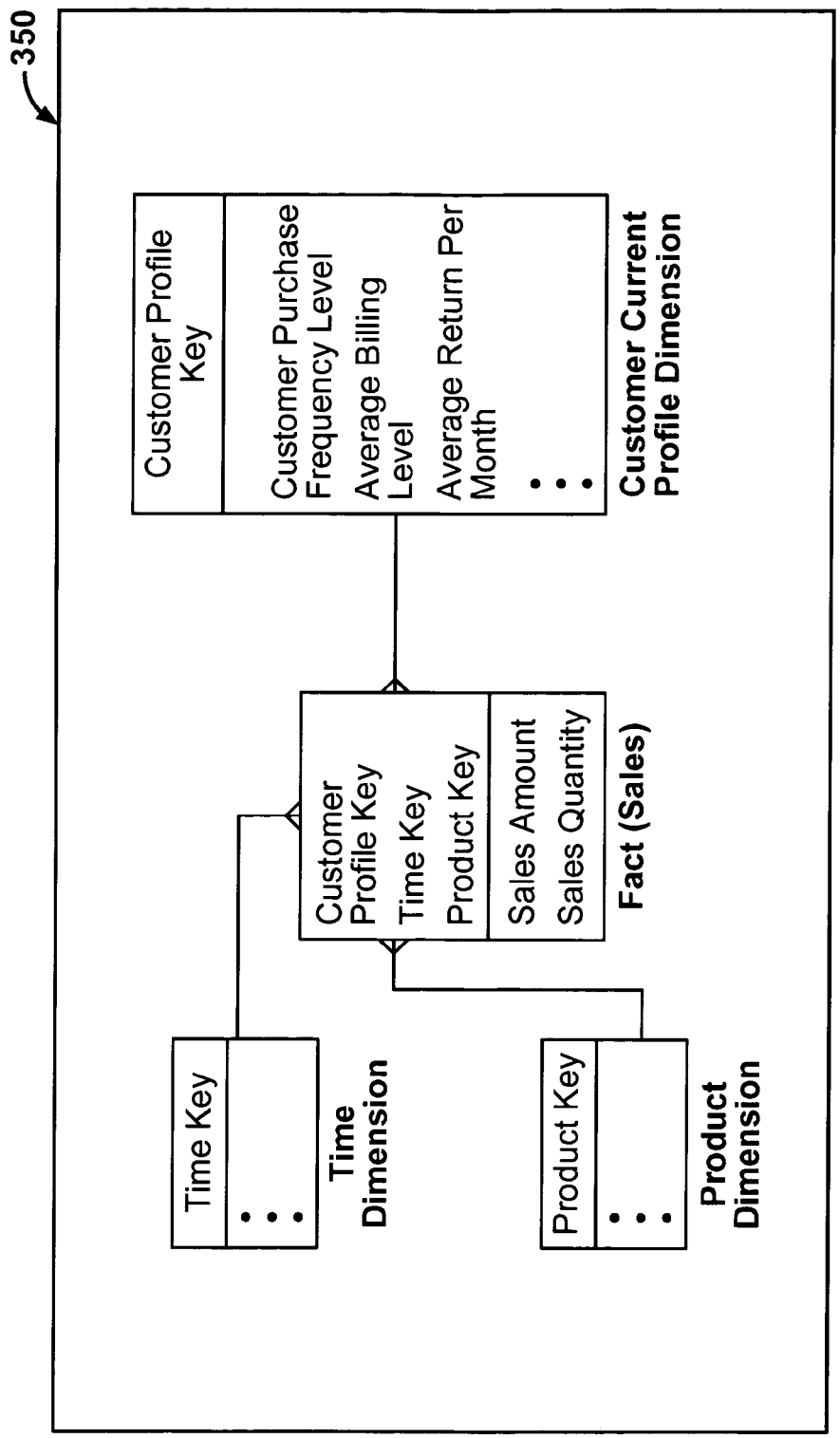

FIG. 3B illustrates a second data model 350 in a particular embodiment according to the present invention. This diagram is merely an illustration and should not limit the scope of the claims herein. One of ordinary skill in the art would recognize other variations, modifications, and alternatives. FIG. 3B illustrates facts of data model 340 of FIG. 3A aggregated in order to obtain sales numbers for customer segments directly. Data model 350 is a representative example of the operational performance data organization having a customer dimension and a hierarchy of dynamic customer segmentations illustrated by cube 250 of FIG. 2C. Data model 350 includes a customer profile entity 352 as a dimension for a fact 354. Data model 350 can provide for customer segments to be defined as gold, silver and copper, or any other acceptable scheme. Aggregation along one or more dimensional hierarchies can be performed. For example, sales numbers can be aggregated for customers at each level.

Figure 3C:
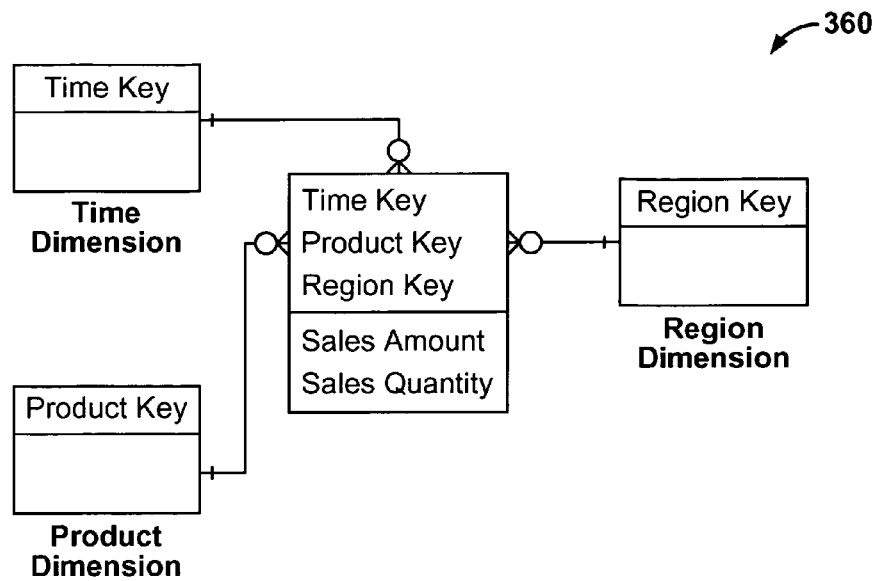

FIG. 3C illustrates a data model 360 in a particular embodiment according to the present invention. This diagram is merely an illustration and should not limit the scope of the claims herein. One of ordinary skill in the art would recognize other variations, modifications, and alternatives. FIG. 3C illustrates a data model 360, which is a representative example of an operational performance based data organization having a customer segmentation filter illustrated by cube 250 of FIG. 2C.

Figure 3D:
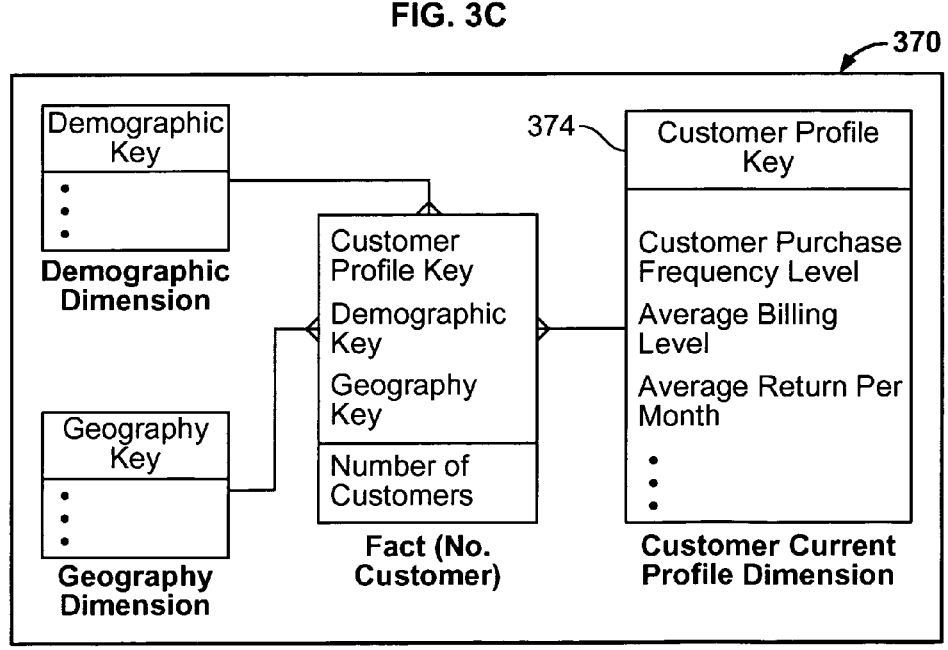

FIG. 3D illustrates a data model 370 in a particular embodiment according to the present invention. This diagram is merely an illustration and should not limit the scope of the claims herein. One of ordinary skill in the art would recognize other variations, modifications, and alternatives. FIG. 3D illustrates data model 370, which can provide for analyzing customer's business behavior using profiling. Data model 370 is a representative example of a customer behavioral based data organization having a customer segmentation dimension illustrated by cube 270 of FIG. 2C. Customer behavioral organizations can illustrate the customer's business behavioral distribution using different categorizations or segmentations. Applications can use such data models to obtain information such as how many customers with certain characteristics can have a certain performance profile. Performance profiles can comprise customer profiles based on aggregated performance measures, for example. This information is provided by the profiling dimension 374 of data model 370, which is based on customer characteristics in the data warehouse.

The data models of FIGS. 3A–3D, as well as other data models readily apparent to those of ordinary skill in the art, can serve as the bases for a plurality of analyses in the embodiments according to the present invention, as will be described in greater detail below with reference to FIGS. 4A–4D.

Figure 4A:
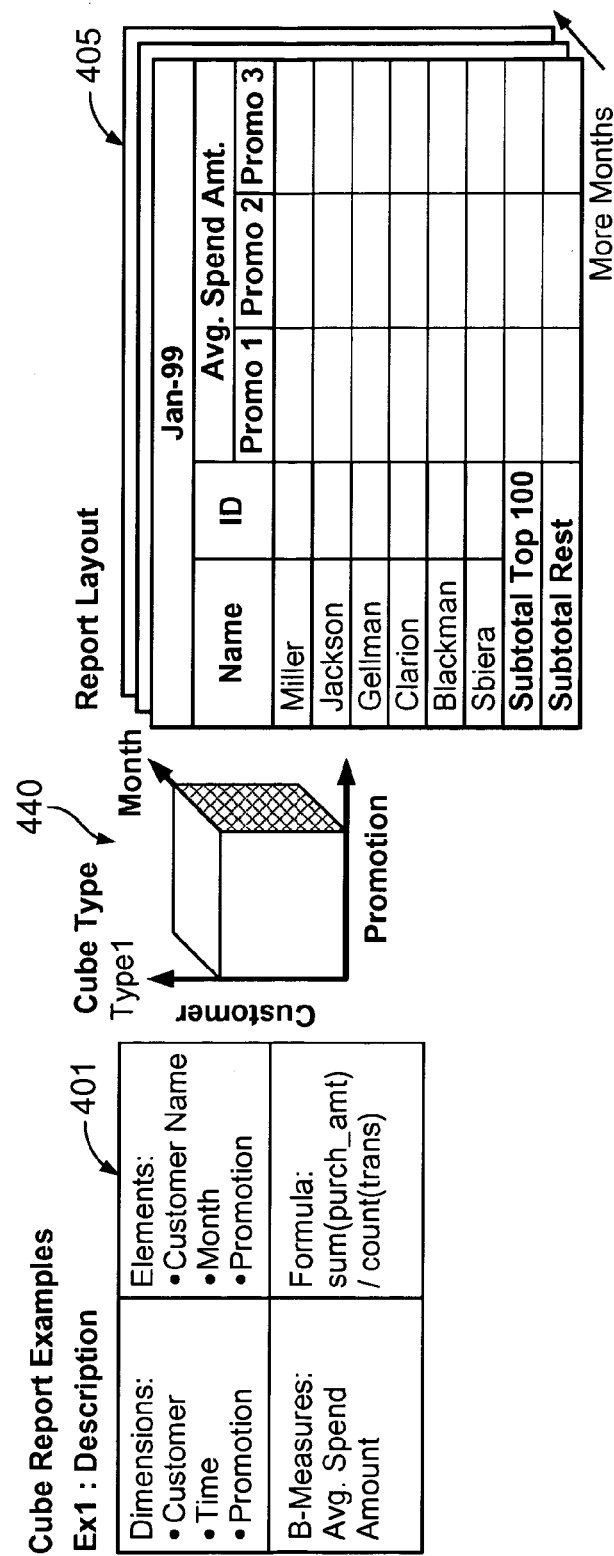
FIGS. 4A–4D illustrate representative visualization techniques in particular embodiments according to the present invention.

FIG. 4A illustrates representative analysis techniques based upon data model 340 of FIG. 3A, which is also represented by cube 240 of FIG. 2C, in a particular embodiment according to the present invention. This diagram is merely an illustration and should not limit the scope of the claims herein. One of ordinary skill in the art would recognize other variations, modifications, and alternatives. FIG. 4A illustrates data model 340 represented by cube representation 440 having dimensions of customer (customer name), promotion (promotion) and time (months). A table 401 provides dimensions of cube 440, a business performance measure, average spending amount in this example, and a formula to compute the business performance measure. Report 405 provides shows example business measure average spending amount as it relates to customer characteristics.

Figure 4B:
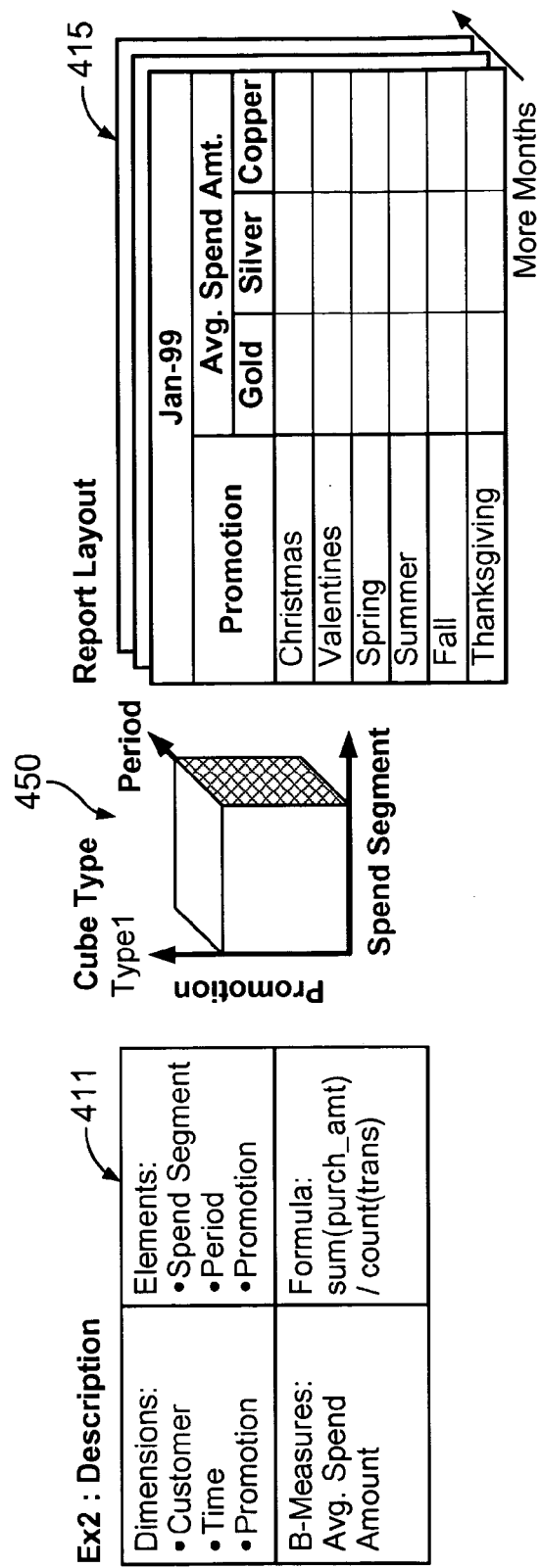

FIG. 4B illustrates representative analysis techniques based upon data model 350 of FIG. 3B, which is also represented by cube 250 of FIG. 2C, in a particular embodiment according to the present invention. This diagram is merely an illustration and should not limit the scope of the claims herein. One of ordinary skill in the art would recognize other variations, modifications, and alternatives. FIG. 4B illustrates data model 350 represented by cube representation 450 having dimensions of customer (spending segment), promotion (promotion) and time (period). A table 411 provides dimensions of cube 450, a business performance measure, average spending amount in this example, and a formula to compute the business performance measure. Report 415 illustrates example business measure average spending amount as it relates to customer segments of gold, silver and copper.

Figure 4C:
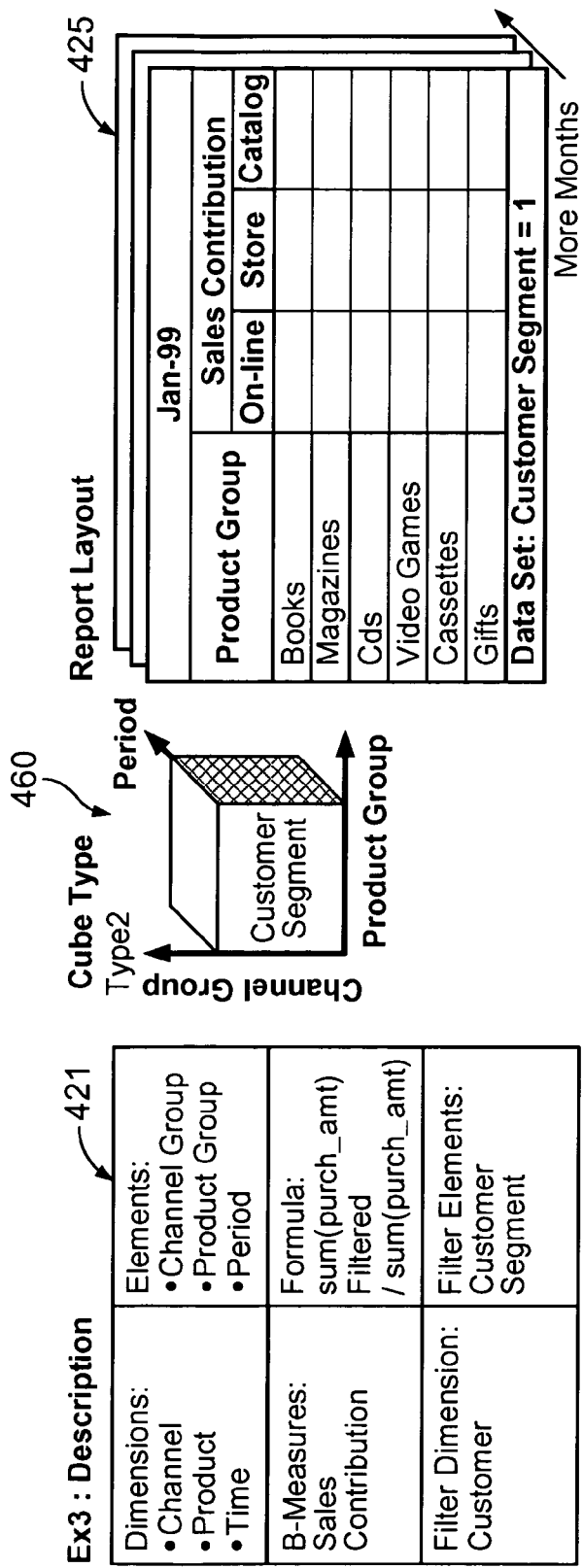

FIG. 4C illustrates representative analysis techniques based upon data model 360 of FIG. 3C, which is also represented by cube 260 of FIG. 2C, in a particular embodiment according to the present invention. This diagram is merely an illustration and should not limit the scope of the claims herein. One of ordinary skill in the art would recognize other variations, modifications, and alternatives. FIG. 4C illustrates data model 360 represented by cube representation 460 having dimensions of channel (channel group), product (product group) and time (period). A table 421 provides dimensions of cube 460, a business performance measure, sales contribution in this example, a formula to compute the business performance measure and a filter dimension, customer in this example. Report 425 provides example business measure sales contribution as it relates to product groups, for various customer segments.

Figure 4D:
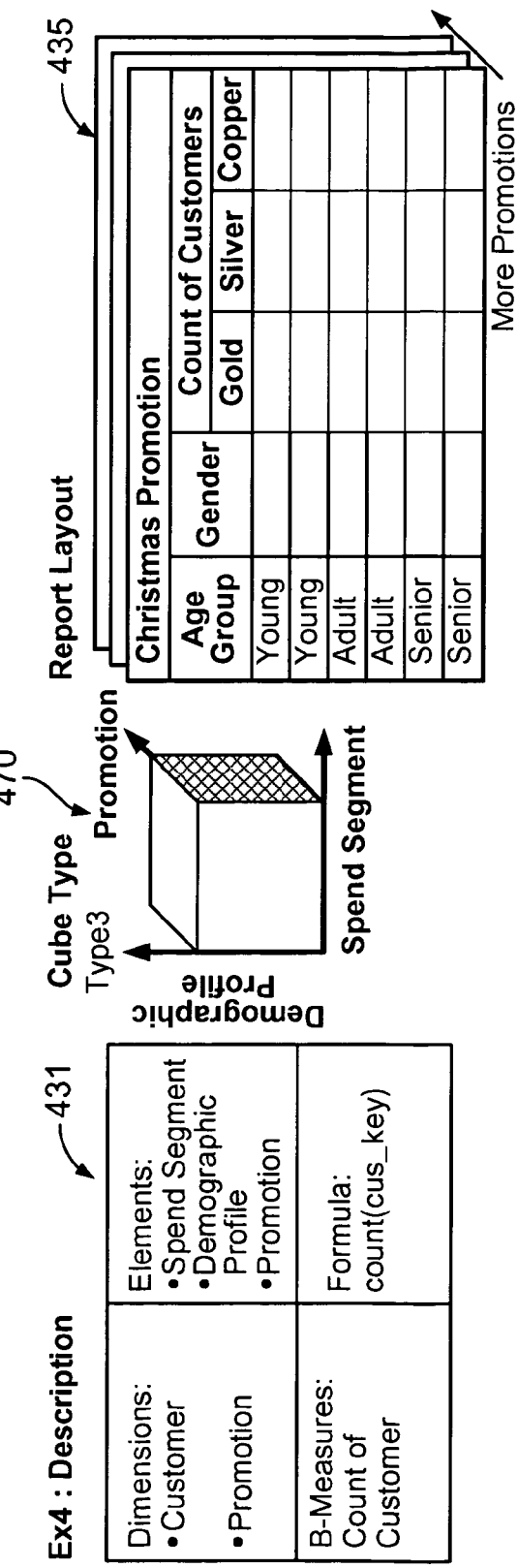

FIG. 4D illustrates a representative analysis technique based upon a data model, such as data model 370 of FIG. 3D, which is also represented by cube 270 of FIG. 2C, in a particular embodiment according to the present invention. This diagram is merely an illustration and should not limit the scope of the claims herein. One of ordinary skill in the art would recognize other variations, modifications, and alternatives. FIG. 4D illustrates data model 370 represented by cube representation 470 having dimensions of customer (spending segment) and promotion (promotion). A table 431 provides dimensions of cube 470, a business performance measure, customer count in this example, and a formula to compute the business performance measure. Report 435 provides shows example business measure customer count as it relates to customer segments of gold silver and copper in this example.

Figure 5A:
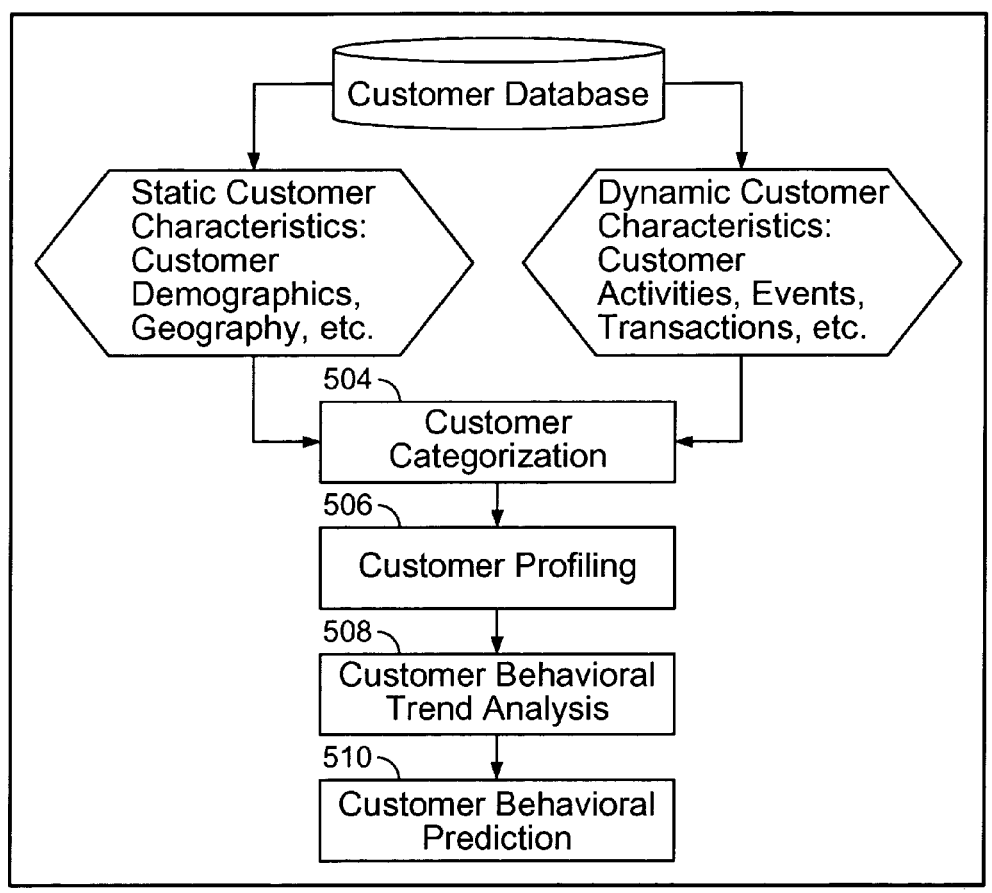
FIGS. 5A–5B illustrate representative flowcharts of simplified process steps according to an embodiment of the present invention.

FIG. 5A illustrates a simplified diagram of representative customer intelligence analyses in a particular embodiment according to the present invention. This diagram is merely an illustration and should not limit the scope of the claims herein. One of ordinary skill in the art would recognize other variations, modifications, and alternatives. Some embodiments will not include all of the analyses illustrated by FIG. 5A. While other embodiments may include other types of analyses. Information to be analyzed is retrieved from a customer database, which can be part of a data warehouse, such as data warehouse 8 of FIG. 1A, for example, or a data mart. In many embodiments, this information will be directly or indirectly related to a specific customer identity. This information can be consolidated and structured for subsequent processing in the following steps. In a representative embodiment consolidating and structuring information can comprise extracting the information from source databases, transforming it into formats compatible with the underlying meta model, which can be a reverse star schema, for example, and then loading the data into the meta model.

In a step 504, customers are categorized (or segmented) based upon one or more characteristics. Characteristics can comprise static characteristics and dynamic characteristics. Static characteristics can comprise customer attributes not directly related to business conduct, but interesting from a business view point in understanding and predicting customer business behavior. For example, customer demographics, geographic information, and the like are static characteristics. Dynamic characteristics can comprise business behavior that customers exhibit during a course of business conduct. For example, customer activities, events, transactions, and information derived from therefrom are examples of dynamic characteristics.

In a step 506, customer profiles can be defined. Customer profiles can be developed for the customer categories developed in step 504 above that are useful for understanding customer behavior in business operation contexts. A plurality of customer profiles can be defined such that each profile can comprise a set of customer characteristics that business decision makers can find useful to compare or correlate. For example, a profile can be defined for customers in age group comprising 20 to 30 years of age, an income level comprising $40,000.00 to $70,000.00 and having an account open from 3 years to 5 years.

In a step 508, customer behavioral trend analysis is performed. Business performance data, such as sales amount, revenue, number of customers, and the like, can be aggregated and correlated with one or more customer profiles, such as customer profiles developed in step 506, for example. In a presently preferable embodiment, trends can be analyzed in the business performance data for the customer profiles. The result can be presented to a user to provide an understanding of the customer business behavior and its trends, such as for example the information stored 435 of FIG. 4D.

In a step 510, a prediction of customer behavior can be made based upon the understanding of customer behavior trends developed in step 508. Predictions about future customer behavior can be made based upon attributes or characteristics of the customer. For example, in Market Basket Analysis, a set of affinity rules can be used to determine a purchase pattern based upon a customer profile.

Figure 5B:
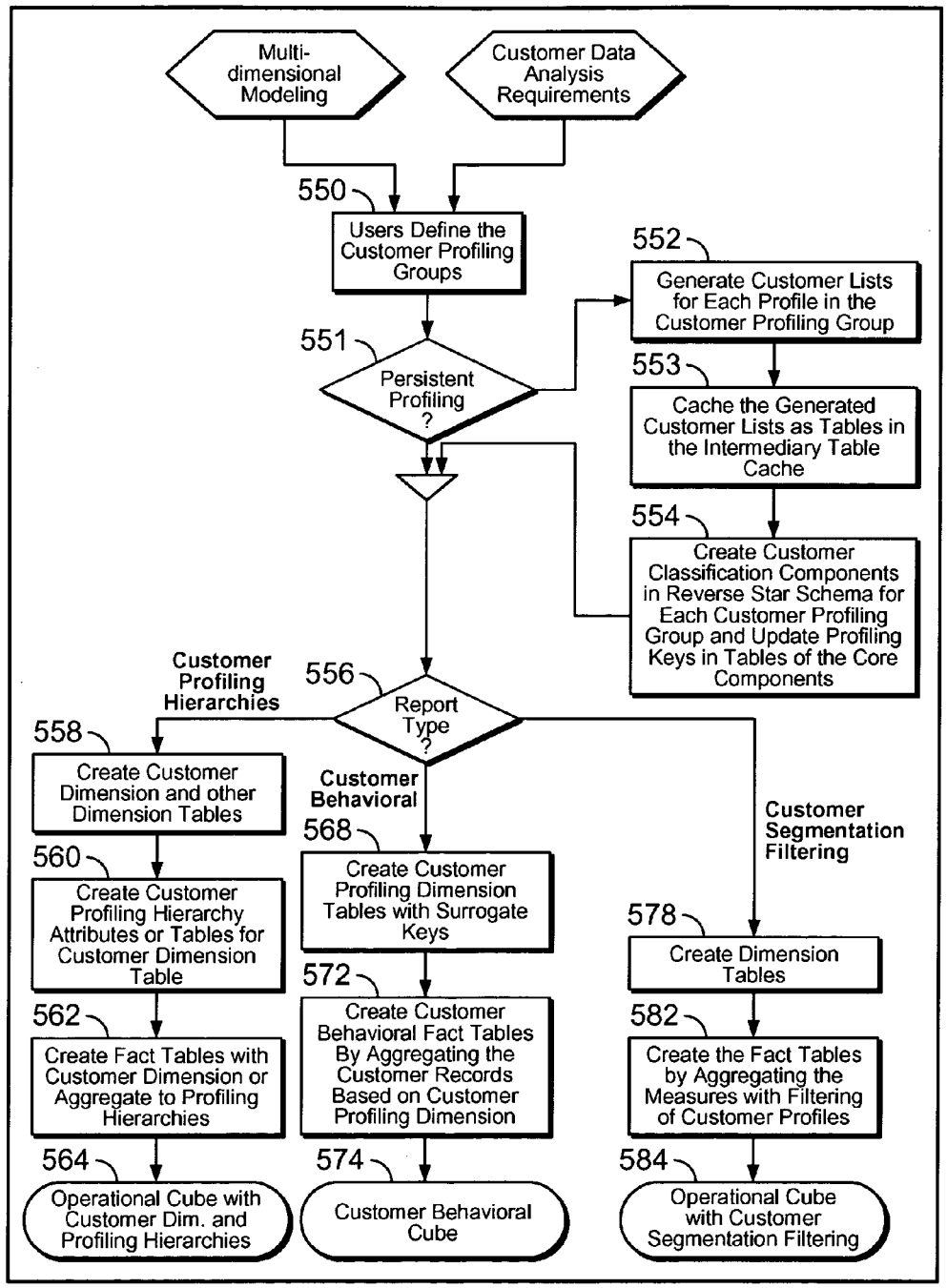

FIG. 5B illustrates a simplified diagram of process steps for creating a multi dimensional report for performing customer intelligence analysis in a representative embodiment according to the present invention. This diagram is merely an illustration and should not limit the scope of the claims herein. One of ordinary skill in the art would recognize other variations, modifications, and alternatives. In a step 550, a definition of at least one customer profile of a plurality of customer profile groups is received. Then, in a step 551, a determination is made whether persistent profiling is desired. If persistent profiling is desired, an optional step 552 of creating a list of customers for each customer profile in the customer profile groups is performed. Then, in another optional step 553, the customer lists created in step 552 are cached in intermediary table cache 12. Then, in an optional step 554, customer classification components in a meta model for each customer profile group are created. Otherwise, or in any event, a step 556 of receiving input indicating a report configuration selection from a user is performed. In a present embodiment, a user can select from a variety of report types, comprising customer profile hierarchy, customer behavioral and customer segmentation and filtering. Embodiments can be readily created by those of ordinary skill in the art that include a subset of these report types, as well as include other types of reports without departing from the scope of the claims herein.

Embodiments according to the present invention can create customer profile reports for information, such as business performance measures stored in a data warehouse, such as data warehouse 8 of FIG. 1A, for example, or a data mart, or other data base. FIG. 5B illustrates a step 558, of creating at least one first dimension table for the customer profile report. In a step 560, a customer profile hierarchy, as well as attributes, are created for the dimension tables created in step 558. Then, in a step 562, at least one fact table is created. The fact table can be created having a customer dimension, or an aggregate of the business performance measures, or other information in the data warehouse, according to the customer profile hierarchy. Finally, in a step 564, a report comprising the one or more dimension tables and the one or more fact tables is provided.

Embodiments according to the present invention can create customer behavior reports, for information, such as customer records, and the like, stored in a data warehouse, such as data warehouse 8 of FIG. 1A, for example, or a data mart, or a data base. FIG. 5B illustrates a step 568 of creating at least one first dimension table for the customer profiles used in the customer behavior report. The dimension tables can include surrogate keys and the like. Then in a step 572 at least one fact table for customer behavioral information is created by aggregating customer records based on customer profiles. Finally, in a step 574, a report comprising the one or more dimension tables and the one or more fact tables is provided.

Embodiments according to the present invention can create operations reports using customer segmentation and filtering and the like, for information, such as business performance measures and the like, stored in a data warehouse, such as data warehouse 8 of FIG. 1A, for example, or a data mart, or other data base. FIG. 5B illustrates a step 578 of creating at least one first dimension table for the operations report. Then in a step 582 at least one fact table can be created by aggregating the business performance measures and filtering according to customer profiles. Finally, in a step 584, a report comprising the one or more dimension tables and the one or more fact tables is provided.

Figure 6A:
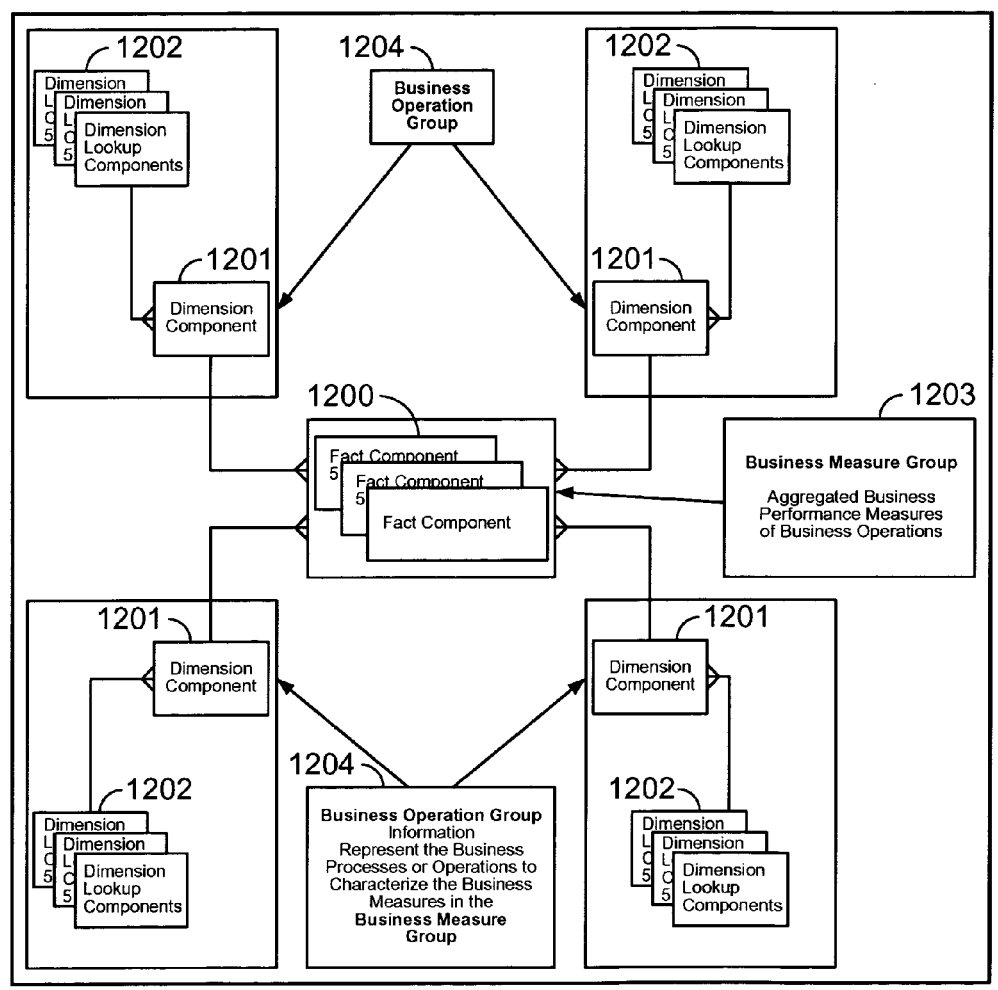
FIGS. 6A–6D illustrate representative data models in a particular embodiments according to the present invention.

FIG. 6A illustrates a simplified entity-relationship diagram of a representative meta model having a star schema organization according to a particular embodiment of the present invention. This diagram is merely an illustration and should not limit the scope of the claims herein. One of ordinary skill in the art would recognize other variations, modifications, and alternatives. A business measure group 1203 represents aggregate business performance measures for a business operation. The business measure group 1203 may comprise one or more "fact components", such as fact component 1200. Fact components represent specific measurements in various business subject areas that enterprise decision makers want to analyze. For example, common fact components can include many business performance measurements such as sales amounts, gross margins sales quantities and the like. FIG. 6A depicts a plurality of business operation groups 1204 which represent business processes or operations that index or describe the measures in business measure group 1203. Embodiments can have any number of business operations groups, such as business operation groups 1204 of FIG. 6A. Business operation group 1204 comprises one or more dimension components 1201, one or more dimension lookup components 1202 and others. Dimension components 1201 represent particular business operations that characterize data in fact components. For example, items such as products, sales channels and the like can be dimensions for a sales fact. Dimension lookup components 1202 describe detail information about dimension components 1201. For example, items such as product categorization, product styles and the like can be dimension lookup components corresponding to a product dimension component.

Embodiments employing star schema data models are useful for providing macroscopic perspective of business operation. Embodiments providing such macroscopic perspective enable a decision support system to provide decision-related information using a "big picture" as a guideline. Accordingly, star schema based embodiments can provide a static solution based upon pre-defined dimensions and summarized data. Data aggregation provided by embodiments having a star schema can provide a high level analysis perspective because of the nature of the multi-dimensional model.

Figure 6B:
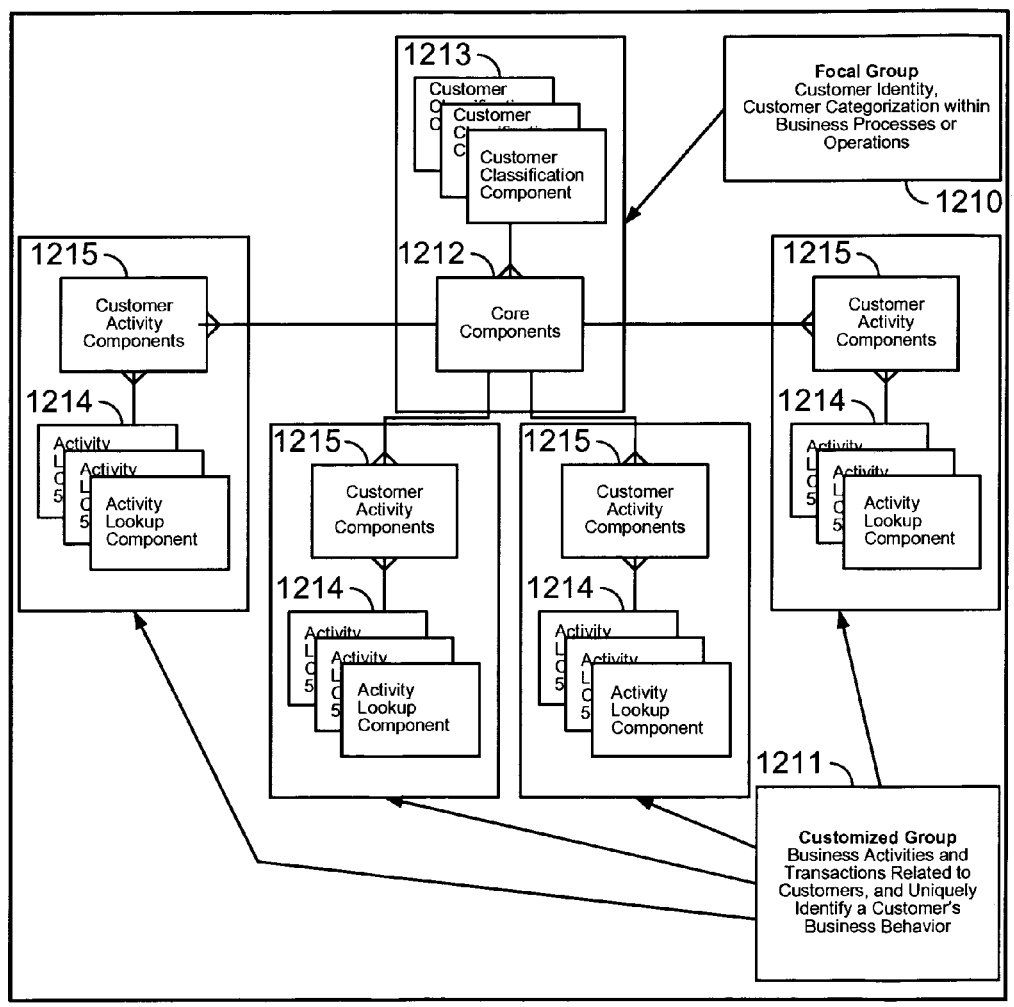

FIG. 6B illustrates a representative meta model for a reverse star schema in a particular embodiment for performing customer data analysis according to the present invention. This diagram is merely an illustration and should not limit the scope of the claims herein. One of ordinary skill in the art would recognize other variations, modifications and alternatives. Many customer data analyses correlate customer events or activities from different business operations across one or more areas of an enterprises' activities. In a particular embodiment, customer data analysis involves correlating different activities within different customer activity components, such as customer activity components 1215 of FIG. 6B. These analyses can correlate customer activities through a plurality of core components, such as core components 1212. Data in core components 1212 can be used as identifying entities for customer activities from different customer activity components. In some embodiments, data analyses operate on a more detailed level of customer activities. These embodiments search one or more activity lookup components, such as activity lookup components 1214, for more detailed customer activity data. The data in customer classification components provides different ways to categorize customers or different business views of the customers. For example, customers can be categorized by geographic region, demographics and the like. Embodiments using one or more of these types of customer classification components can provide a plurality of useful possible ways of viewing customer data analysis results. Embodiments employing a reverse star schema provide a detail level view for data that provides the capability to perform analysis based on concepts such as customer data, customer activities and their correlation at the transaction or event level.

Figure 6C:
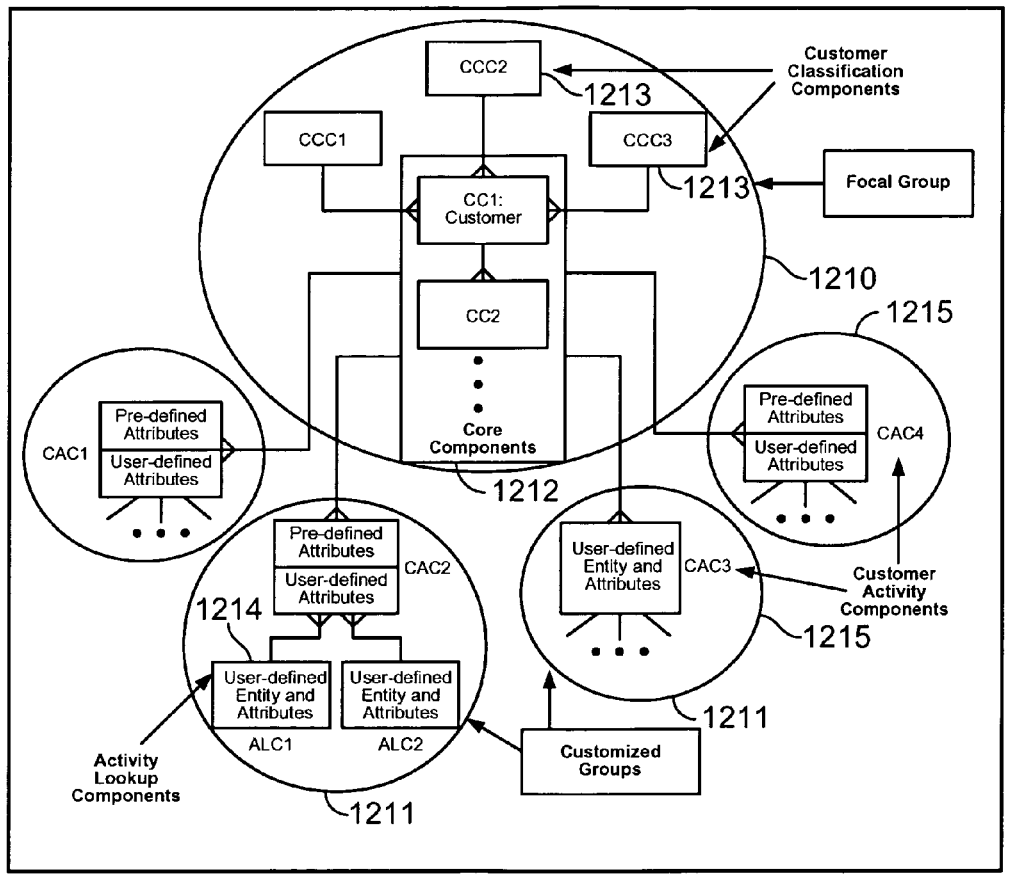

FIG. 6C illustrates a simplified general form of a representative data model in a particular embodiment according to the present invention. This diagram is merely an illustration and should not limit the scope of the claims herein. One of ordinary skill in the art would recognize other variations, modifications, and alternatives. The data model of FIG. 6C is a data model having a reverse star schema organization. FIG. 6C illustrates a representative data model comprising a focal group 1210, comprising at least one of a plurality of core components 1212, at least one of a plurality of customer classification components 1213, at least one of a plurality of customized groups 1211, at least one of a plurality of customer activity components 1215 and at least one of a plurality of activity lookup components 1214. Other components can also be included, and not all of the components illustrated need be present in some embodiments without departing from the scope of the present invention.

A focal group, such as focal group 1210, for example, includes components that describe information such as customer characteristics, profiles, business related classifications, customers' roles, definitions and the like in different business functional areas. FIG. 6C illustrates two types of components in focal group 1210. Other components can also be included without departing from the scope of the present invention. FIG. 6C. illustrates core components 1212, and customer classification components 1213. Core components 1212 include a Customer entity (CC 1) and other related customer identity data designated by (CC2–CCn). Information such as an account identifier, social security number, encrypted name, and the like are examples of such customer identity data. These entities can be especially useful in performing customer event correlation analysis. Customer classification components 1213 describe information about the customers' roles or positions in the business organizations or processes. These descriptive components can be related to the structure or organization of a customers' business, for example, information such as region, channel, sales organization and the like, or to characteristics of the customer, such as business profile, demographics, current profile, and the like.

The components of customized group 1211 correspond to various forms of operational business transactions. As event transactions can be scattered over time, these components comprise a set of business measures and attributes. These events can be independent as well as dependent from one another. A particular sequence of events can be used to describe different stages of customer activity. For example, in a particular time period, a customer may go through a sequence of events such as: subscription>billing>payment>promotion>price plan change>service call>cancellation. Each event can involve a plurality of different business processes or operations that reflect a lifecycle of a customer.

Customized group 1211 comprises a plurality of customer activity components 1215, a plurality of activity lookup components 1214 and the like. Customer activity components 1215 can represent event transactions or measures about customer activities. These entities can comprise one or more attributes, such as a transaction type, a transaction timestamp and others. When customer activity components 1215 are defined, a domain value for a transaction type is selected. Transaction type is an attribute useful for event correlation analysis. In one particular embodiment, users can define customer activity components, such as customer activity components 1215, by selecting attributes from a plurality of pre-built attributes. Some embodiments can also provide the capability to add user-defined attributes. Many embodiments provide the capability to define customer activity entities (e.g., CAC3 in FIG. 6C). Activity lookup components 1214 represent entities that detail characteristics of customer event transactions. For example, products purchased in a transaction, store location of purchase and the like can be stored as activity lookup entities 1214 for analysis.

Figure 6D:
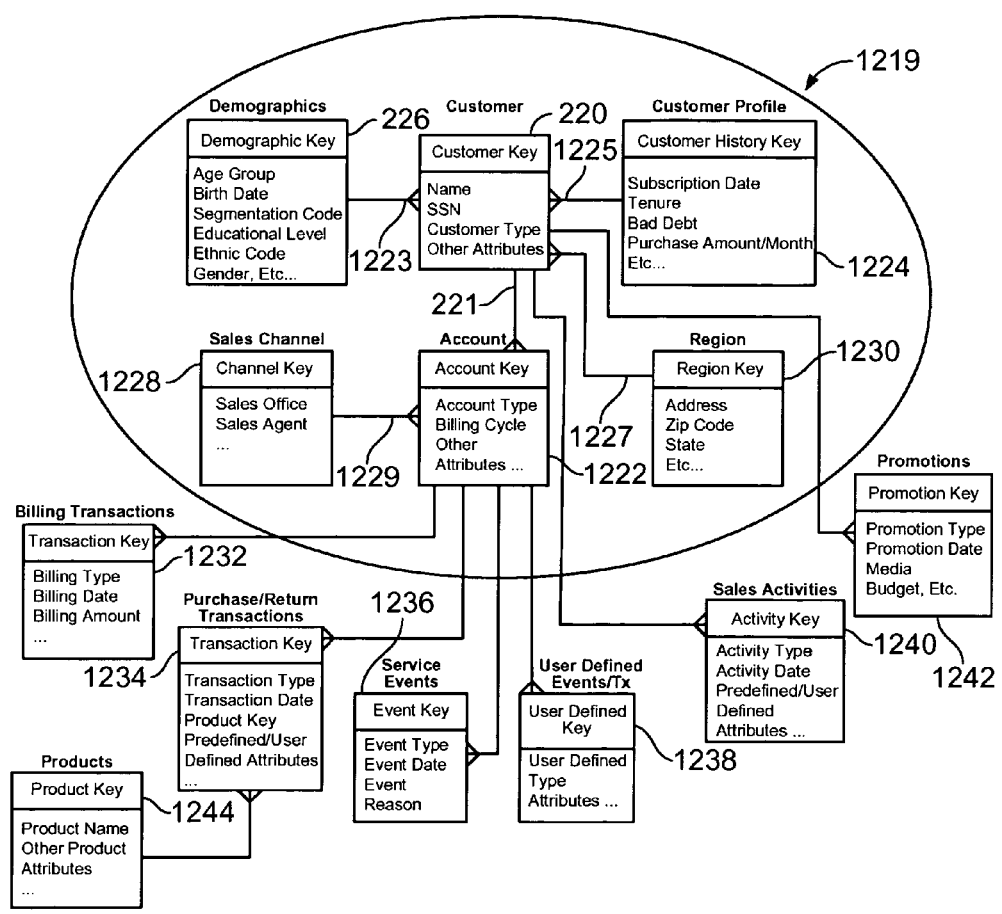

FIG. 6D illustrates a simplified entity relationship diagram of a representative example of a data model having a reverse star schema organization in a particular embodiment according to the present invention. This diagram is merely an illustration and should not limit the scope of the claims herein. One of ordinary skill in the art would recognize other variations, modifications, and alternatives. In the example data model of FIG. 6D, core components 1212 of FIG. 6C comprise a customer entity 1220 and an account entity 1222. Arrow 1221 indicates a one to many relationship between customer entity 1220 and account entity. The presence of entities such as customer entity 1220 and account entity 1222 enables data model 1219 to provide account level concepts for queries relating to customers in the business model under consideration. FIG. 6D illustrates customer classification component 1213 of FIG. 6C comprising a plurality of entities, of which four are illustrated: A sales channel entity 1228 a customer region entity 1230, a customer profile entity 1224 and a demographics entity 1226. Many embodiments can include other entities, or include some but not all of these entities without departing from the scope of the present invention.

In a particular representative embodiment, demographics entity 1226, customer profile entity 1224 and customer region entity 1230 have relationships with customer entity 1220. For example, as illustrated in FIG. 6D, arrow 1223 indicates a many to one relationship between customer entity 1220 and demographics entity 1226. Similarly, arrow 1225 indicates a many to one relationship between customer entity 1220 and customer profile 1224; arrow 1227 indicates a many to one relationship between customer entity 1220 and region entity 1230. Further, in this particular embodiment, sales channel entity 1228 has a one to many relationship with account entity 1222, as indicated by arrow 1229 in FIG. 6D.

In the particular representative embodiment illustrated by FIG. 6D, a plurality of different entities comprise customer activity components 1215 of FIG. 4A. These entities include a billing transactions entity 1232, a purchase/return transactions entity 1234, a service events entity 1236, a sales activities entity 1240, a promotions entity 1242 and a user defined events 1238. Further, FIG. 6D illustrates an activity lookup component, which comprises a products entity 1244. Other entities not shown or described here can also be included in some embodiments according to the present invention. Further, some embodiments may not provide all the entities described here, without departing from the scope of the present invention.

CONCLUSION

Although the above has generally described the present invention according to specific systems, the present invention has a much broader range of applicability. In particular, the present invention is not limited to a particular kind of data schema, but can be applied to any data model where an improved or optimized analysis is desired for use with customer centered data warehousing systems and applications. Thus, in some embodiments, the techniques of the present invention could provide access to many different legacy business, governmental and educational databases of all kinds. Of course, one of ordinary skill in the art would recognize other variations, modifications, and alternatives.

What is claimed is:

1. An apparatus comprising:
   a memory,
   a bus,
   a processor, coupled to the memory by the bus, the processor operative to carry out the steps of:
      receiving a definition of a reverse star schema meta-model;
      receiving a definition of at least one customer profile group;
      generating a data warehouse populated with information from a source database in accordance with the reverse star schema meta-model;
      receiving input indicating at least one quantity of interest in the information;
      receiving a definition for a data model;
      dynamically creating at least one generated database with information from the data warehouse based upon the data model, the customer profile group and configured to the quantity of interest; and
      displaying at least a portion of the dynamically generated database.

2. The apparatus of claim 1 wherein the processor is further operative to carry out the steps of:
   generating a customer profile report and wherein the information comprises business performance measures;
   creating at least one first dimension table, including:
      creating a customer profile hierarchy; and
      creating at least one fact table, including:
         aggregating business performance measures according to the customer profile hierarchy.

3. The apparatus of claim 1, wherein the information comprises business performance measures, and wherein the processor is further operative to carry out the steps of:
- generating an operation report;
- creating at least one fact table, including:
  - aggregating the business performance measures; and
  - filtering the customer profiles.

4. The apparatus of claim 1, wherein the information comprises customer records, and wherein the processor is further operative to carry out the steps of:
- generating a customer behavior report;
- creating at least one first dimension table, including:
  - creating at least one customer profiling dimension based upon the at least one customer profile group received; and
  - creating at least one fact table, including:
- aggregating customer records based on at least one customer profiling dimension.

5. The apparatus of claim 1, wherein the processor is further operative to carry out the steps of:
- creating a list of customers for each customer profile group;
- creating at least one intermediary data structure to manage a list of customers; and
- creating customer classification components in the meta-model for each customer profile group.

6. The apparatus of claim 1 wherein the information comprises at least one of telecommunications information, financial information, retail marketing information, insurance information, and health care information.

7. The apparatus of claim 1, wherein the processor is further operative to carry out the steps of:
- receiving a selection of a targeted customer segment of interest as the quantity of interest;
- generating at least one targeted customer segment table based upon the dynamically generated database; and
- providing the targeted customer segment table to external applications.

8. The apparatus of claim 1, wherein dynamically generating a database further comprises:
- receiving an input from an on-line application processor (OLAP);
- transforming the input into a database query based upon the data model; and
- providing information in response to the database query.

9. A computer implemented method, comprising a computer performing the following steps:
- receiving a definition of a reverse star schema meta-model;
- receiving a definition of a customer profile group;
- generating a data warehouse populated with information from a source database in accordance with the reverse star schema meta-model;
- receiving input indicating a quantity of interest in the information;
- receiving a definition for a data model;
- dynamically creating a dynamically generated database from information in the data warehouse based upon the data model, customer profile group and configured to the quantity of interest; and
- displaying at least a portion of the dynamically generated database.

10. The method of claim 9, further comprising:
- generating a customer profile report and wherein the information comprises business performance measures;
- creating at least one first dimension table, including:
  - creating a customer profile hierarchy; and
  - creating at least one fact table, including:
    - aggregating business performance measures according to the customer profile hierarchy.

11. The method of claim 9, wherein the information comprises business performance measures, the method further comprising:
- generating an operation report;
- creating at least one fact table, including:
  - aggregating the business performance measures; and
  - filtering the customer profiles.

12. The method of claim 9, wherein the information comprises customer records, the method further comprising:
- generating a customer behavior report;
- creating at least one first dimension table, including:
  - creating at least one customer profiling dimension based upon the at least one customer profile group received; and
  - creating at least one fact table, including:
    - aggregating customer records based on at least one customer profiling dimension.

13. The method of claim 9 wherein information comprises at least one of telecommunications information, financial information, retail marketing information, insurance information, and health care information.

14. A computer readable medium, carrying one or more sequences of instructions, which instructions, when executed by one or more processors, cause the one or more processors to carry out the steps of:
- receiving a definition of a reverse star schema meta-model;
- receiving a definition of a customer profile group;
- generating a data warehouse populated with information from a source database in accordance with the reverse star schema meta-model;
- receiving input indicating a quantity of interest in the information;
- receiving a definition for a data model;
- dynamically creating a dynamically generated database from information in the data warehouse based upon the data model, customer profile group and configured to the quantity of interest; and
- displaying at least a portion of the dynamically generated database.

15. The computer readable medium of claim 14, further comprising instructions for carrying out the steps of:
- generating a customer profile report and wherein the information comprises business performance measures;
- creating at least one first dimension table, including:
  - creating a customer profile hierarchy; and
  - creating at least one fact table, including:
    - aggregating business performance measures according to the customer profile hierarchy.

16. The computer readable medium of claim 14, wherein the information comprises business performance measures, the computer readable medium further comprising instructions for carrying out the steps of:
- generating an operation report;
- creating at least one fact table, including:
  - aggregating the business performance measures; and
  - filtering the customer profiles.

17. The computer readable medium of claim 14, wherein the information comprises customer records, the computer readable medium further comprising instructions for carrying out the steps of:
  generating a customer behavior report;
  creating a first dimension table, including:
    creating a customer profiling dimension based upon the definition of a customer profile group received; and
  creating a fact table, including:
    aggregating customer records based on the customer profiling dimension.

18. The computer readable medium of claim 14 wherein information comprises at least one of telecommunications information, financial information, retail marketing information, insurance information, and health care information.

* * * * *